United States Patent [19]
Shibata et al.

[11] Patent Number: 5,848,188
[45] Date of Patent: Dec. 8, 1998

[54] SHAPE MEASURE DEVICE

[75] Inventors: Susumu Shibata; Katsunori Ishigure, both of Komaki; Yukio Sato, Nagoya, all of Japan

[73] Assignees: CKD Corporation; Kabushiki Kaisha Nextar, both of Japan

[21] Appl. No.: 524,625

[22] Filed: Sep. 7, 1995

[30]       Foreign Application Priority Data

| Sep. 8, 1994 | [JP] | Japan | ................................... | 6-242031 |
| Sep. 15, 1994 | [JP] | Japan | ................................... | 6-247091 |
| May 18, 1995 | [JP] | Japan | ................................... | 7-145292 |

[51] Int. Cl.$^6$ ...................................................... G06K 9/46
[52] U.S. Cl. ........................... 382/203; 348/132; 382/286
[58] Field of Search .................................... 382/141, 142, 382/286, 284, 203; 348/92, 94, 95, 131, 132

[56]                References Cited

U.S. PATENT DOCUMENTS

| 3,774,162 | 11/1973 | Faherty | ................................. | 340/172.5 |
| 5,280,542 | 1/1994 | Ozeki | ..................................... | 382/141 |
| 5,446,549 | 8/1995 | Mazumder | .............................. | 356/376 |

FOREIGN PATENT DOCUMENTS

| 64-54208 | 3/1989 | Japan . |
| 3-56402 | 8/1991 | Japan . |
| 8-20232 | 3/1996 | Japan . |
| 5-332737 | 8/1997 | Japan . |

*Primary Examiner*—Joseph Mancuso
*Attorney, Agent, or Firm*—Finnegan, Henderson, Farabow, Garrett & Dunner, L.L.P.

[57]                ABSTRACT

Disclosed herein is a high-resolution shape measuring device having a scanning device capable of scanning an object to be measured at a high constant rotational speed. The shape measuring device includes a laser light source for generating flashing laser light, a pattern memory storing different flash patterns of the laser light, a polygon mirror as the scanning device, and a CCD camera for picking up an image formed on the object by the scanning of the laser light, wherein the shape of the object is computed according to image data obtained by the CCD camera. The shape measuring device further includes a motor for rotating the polygon mirror and a photodetector for generating a PD signal when the phase of rotation of the polygon mirror becomes a specific phase. The polygon mirror is rotated so as to scan the object plural times in a pickup time per frame of the CCD camera by using one of the flash patterns, and the flash pattern used is reset by the PD signal and is repeatedly used during the pickup time per frame. Further, the number of times of scanning for actually directing the laser light onto the object can be selected from the number of plural times of scanning performed in the pickup time per frame in order to adjust laser light quantity.

39 Claims, 14 Drawing Sheets

FIG. 2

| MEMORY ADDRESSES | 7 | 6 | 5 | 4 | 3 | 2 | 1 | 0 |
|---|---|---|---|---|---|---|---|---|
| 255 | 1 | 0 | 0 | 0 | 0 | 0 | 0 | 0 |
| ⋮ | | | | | | | | |
| 8 | 0 | 0 | 0 | 0 | 1 | 1 | 0 | 0 |
| 7 | 0 | 0 | 0 | 0 | 0 | 1 | 0 | 0 |
| 6 | 0 | 0 | 0 | 0 | 0 | 1 | 0 | 1 |
| 5 | 0 | 0 | 0 | 0 | 0 | 1 | 1 | 1 |
| 4 | 0 | 0 | 0 | 0 | 0 | 1 | 1 | 0 |
| 3 | 0 | 0 | 0 | 0 | 0 | 0 | 1 | 0 |
| 2 | 0 | 0 | 0 | 0 | 0 | 0 | 1 | 1 |
| 1 | 0 | 0 | 0 | 0 | 0 | 0 | 0 | 1 |
| 0 | 0 | 0 | 0 | 0 | 0 | 0 | 0 | 0 |

MEMORY BITS

| FACE NUMBERS USED IRRADIATION | LIGHT QUANTITY |
|---|---|
| 1 | 1/6 |
| 1, 2 | 2/6 |
| 1~3 | 3/6 |
| 1~4 | 4/6 |
| 1~5 | 5/6 |
| 0~6 | 6/6 |

SHAPE MEASURE DEVICE

BACKGROUND OF THE INVENTION

1. Field of the Invention

The present invention relates to a shape measuring device for measuring a three-dimensional shape of an object by using optical means in a noncontact fashion, and more particularly to a shape measuring device which can perform stable measurement by using a rotating mirror rotating at a high speed. The present invention relates also to a shape measuring device characterized in that the precision of measurement is improved and the time of measurement is reduced by correcting a drive pattern of a scanner and a flash pattern of laser light. The present invention relates also to a shape measuring device characterized in that the time of measurement is reduced by reducing a memory capacity and a computation amount to be required.

2. Description of Related Art

Conventionally, a space coding method is known as one of typical optical shape measuring methods. The space coding method is one of active measuring methods employing a measuring instrument having a light projecting device, in which light projected from the light projecting device onto an object to be measured and the light reflected on the object is measured.

An example of such a shape measuring device employed in the space coding method is disclosed in Japanese Patent Laid-open No. Hei 5-332737, which is shown in FIG. 15. The shape measuring device shown in FIG. 15 includes a laser light source 1, a lens system 2 for shaping laser light emitted from the laser light source 1 into a slit-shaped beam, a scanning device 91 for directing the laser light shaped above onto an object Q to be measured, a CCD camera 6 for detecting the light reflected on the object Q, and a control section 82 for controlling these members. Further, a binarizing circuit 83 for binarizing image data obtained by the CCD camera 6 is connected to an arithmetic processing section through first, second, third, and fourth memories 84, 85, 86, and 87 for storing the binarized data as space code data. Further, a selector 88 is provided to select one of the first to fourth memories 84 to 87 into which the binarized data is to be stored.

The laser light source 1 is controlled to generate flashing laser light in accordance with a given rule, and the scanning device 91 is rotated or reciprocated to scan the object Q with the laser light. Accordingly, a stripe pattern consisting of a portion irradiated with the laser light and a portion not irradiated with the laser light is formed on the surface of the object Q. The CCD camera 6 picks up this stripe pattern as image data. The scanning of the laser light is performed once in the storage time per frame of the CCD camera 6. Accordingly, data of the stripe pattern on the object Q is stored as image data per frame. The binarizing circuit 83 binarizes the image data, and the binarized data is stored into one of the first to fourth memories 84 to 87 selected by the selector 88. When the scanning is performed plural times by using different flash patterns, plural different pieces of binarized stripe pattern data are stored as different space codes. In this manner, plural frames of data are separately captured, so that the plural memories, i.e., the first to fourth memories 84 to 87, are necessary. Then, an arithmetic device incorporated in the arithmetic processing section computes coordinates of points on the object Q corresponding to different pixels according to the above data by utilizing the principle of triangulation, thus measuring the shape of the object Q.

The calculation of a height coordinate by triangulation will now be described with reference to FIG. 14. The laser light from the laser light source 1 is reflected on the scanning device 91 and is then directed onto the object Q. Then, the light reflected on the object Q is picked up by the CCD camera 6. As shown in FIG. 14, let h1 denote the height of the scanning device 91 from a measurement reference plane (a plane perpendicular to the optical axis of the CCD camera 6), θ denote the angle of deflection of the laser light reflected on the scanning device 91, z denote the height of a laser irradiation position on the object Q from the measurement reference plane, θ denote the height of an objective lens 7 of the CCD camera 6 from the measurement reference plane, f denote the focal length of the objective lens 7, 1 denote the distance from a reference point 0 on the measurement reference plane to the optical axis of the CCD camera 6, and x denote the pixel position where the reflected light is detected on a photosensitive surface 8 of the CCD camera 6. Then, the height z can be expressed as follows:

$$z = \{x \cdot hc - f(1 - h1 \cdot \tan\theta)\}/(x + f \cdot \tan\theta) \quad (1)$$

In Eq. (1), all of hc, f, 1, and h1 are known. Accordingly, if x and θ are given, z can be calculated from Eq. (1). The value of x can be obtained from the coordinate data obtained by binarizing the image data, and the value of θ can be obtained from a drive signal to the scanning device 91. The above arithmetic processing is performed on software in the arithmetic device of the arithmetic processing section. Although the y-directional coordinate at the pixel position is not shown in FIG. 14, it may be directly obtained from the y-directional value of the position of each pixel detected in the CCD camera 6. Accordingly, the calculation of the height z corresponding to each pixel position x results in the measurement of the shape of the object Q.

In this shape measuring device, the flashing of the laser light source 1 is intended to eliminate the need for mechanical mask patterns and their replacing operation and thereby realize a reduction in size of the device and quick measurement.

However, the above prior art shape measuring device has various problems to be solved.

(First Problem)

A reflecting mirror such as a galvanomirror or a polygon mirror is used as the scanning device 91. In the case of using the polygon mirror, the deflection of the laser light is effected by rotating the polygon mirror. However, the rotational speed of the polygon mirror is much lower than a rotational speed at which a motor can be stably driven. That is, while the polygon mirror is rotated to deflect the laser light and thereby scan the object with the laser light once in the storage time per frame of the CCD camera 6, one cycle of scanning is effected by partial rotation of the polygon mirror determined by dividing one rotation by the number of mirror faces of the polygon mirror (e.g., in the case where the polygon mirror has 12 mirror faces, the partial rotation is 1/12 rotation, or 30°). On the other hand, the storage time per frame is decided by a video rate, and it is usually 1/60 second. Accordingly, the rotational speed of the polygon mirror required to perform one cycle of scanning in the storage time per frame becomes 300 rpm. This rotational speed is much lower than a speed region at which an ordinary motor can be stably driven.

Accordingly, fluctuations in driving speed of the motor, such as wow and flatter or jittering are not negligible, causing a reduction in measurement precision. It is considered to interpose a speed reducing gear between the motor and the polygon mirror; however, it is difficult to avoid an increase in size of the device, and there is another problem in machining precision, backlash, etc. of the speed reducing gear. Further, while the rotation of the polygon mirror must be completely synchronized with the video rate of 1/60 second, the synchronization may be realized by attaching an encoder to the polygon mirror to read information of rotational angles of the polygon mirror and thereby control the rotation of the polygon mirror. In this case, however, the encoder is required to have a resolution of about 5000 angular sections per mirror face. In the case where the polygon mirror has 12 mirror faces, the encoder must have a resolution of about 60000 angular sections per rotation. Accordingly, the device becomes extremely expensive, and is difficult to reduce in size.

(Second Problem)

There is a problem in precision of deflection of the laser light by the scanning device 91. As mentioned above, deflection angle data of the laser light is used for calculation of point coordinates on the object Q. Accordingly, if the deflection angle data includes an error, the point coordinates calculated also include an error due to the above error, causing a reduction in precision of the shape measurement. In the case of using a galvanomirror as the scanning device 91, the galvanomirror is oscillated with a given pattern to deflect the laser light. However, in general, high-precision oscillation of the galvanomirror is difficult to obtain, thus causing the above problem. The low precision of the oscillation of the galvanomirror is considered to be due to the nonlinear relation between a drive signal to the galvanomirror and an oscillating angle of the galvanomirror. That is, there occurs a time lag of response to the drive signal because of inertia or the like. Further, the galvanomirror is susceptible to external factors such as temperature changes or external vibrations. FIG. 16 shows the relation between a command value and an actual deflection angle of the galvanomirror following the command value.

In FIG. 16, the horizontal axis represents time, and the vertical axis represents angle. It is understood from FIG. 16 that the follow-up value shown by a broken line is slightly delayed from the command value shown by a solid line forming a triangular wave. Such a time lag causes an unnegligible error in the deflection angle data, thus inviting the reduction in precision of the shape measurement.

(Third Problem)

There is a problem that a space code is divided at unequal intervals on the measurement reference plane (the plane perpendicular to the optical axis of the CCD camera 6). This problem is different from the above second problem of nonlinearity of the deflection angle. As shown in FIG. 17, the space code means a series of numbers allocated to plural sections on the measurement reference plane obtained by dividing an angular range of laser light dispersed by the scanning device 91 (galvanomirror or polygon mirror) at the flashing intervals of the laser light. The control of the laser light source becomes easiest when the flashing intervals are timewise equal to each other. In this case, however, the angles ø shown in FIG. 17 become equal to each other, but the widths of the sections (shown by $1_1$ to $1_6$ in FIG. 17) on the measurement reference plane become different from each other. This is due to the fact that the larger the number of the space code, the larger the distance from the scanning device 91 to the position on the measurement reference plane corresponding to the number of the space code, and the smaller the angle of intersection between the laser light and the measurement reference plane.

As a result, there occurs a difference in code width of the space code to be captured by the CCD camera 6 between a farther position and a nearer position on the measurement reference plane with respect to the scanning device 91. Accordingly, the larger the distance from the scanning device 91 to the measurement reference plane, the smaller the resolution of the space code data. Thus, the space resolution cannot be fixed to a certain value in a visual field, and the effect by the elimination of mechanical mask patterns as mentioned above cannot be enough exhibited. Further, there is another problem that the luminance of the laser light becomes nonuniform in the visual field. That is, as shown in FIG. 18, there occurs a difference between lengths $d_1$ and $d_2$ of the slit-shaped laser light in the visual field in spite of the fact that the spread angle ω of the laser light is fixed. As a result, the luminance to be captured by the CCD camera varies in the visual field, which is not ideal as measurement conditions.

(Fourth Problem)

There is a problem in capacity of the memory for storing the binarized image data. That is, it is required to increase a resolution as the space code in order to ensure the precision of the shape measurement. To meet this requirement, the measurement must be made with many kinds of patterns, resulting in an increase in number of frames to be picked up by the CCD camera 6. Since the memory is used on a frame-by-frame basis, many memories are required. Although the four memories are used in FIG. 15, more memories would be required with an increase in number of frames to improve the measurement precision.

(Fifth Problem)

There is a problem in time required for the shape measurement. That is, the calculations of values of z corresponding to values of x and θ are separately made on the software, causing an increase in time required for the shape measurement, so that the measurement cannot be quickly performed. For example, in the case where the number of pixels in the CCD camera 6 is 512×256 (cells), the time required to perform the shape measurement by using general-purpose computing means such as a personal computer becomes about 4 minutes. While this required time is somewhat influenced by a calculation technique for binarizing data or other factors, the value of about 4 minutes is hardly changed so far as the personal computer is used. This required time is much longer than that in a rangefinder system now in practical use. Accordingly, the prior art shape measuring device mentioned above is absolutely unsatisfactory in respect of the required time in application to a vision system of a robot, for example. Even by using high-grade equipment such as a workstation in place of the personal computer, the required time can be merely reduced to about 40 seconds, which is yet unsatisfactory.

Further, even by using high-speed computing means such as a dedicated MPU, dedicated CPU, or DSP, the computation for the pixels of 512×256 cannot be completed within the time required to capture an image in this device, i.e., within 0.15 second. This value of 0.15 second is the capturing time of 1/60 second×9 frames. The value of 1/60 second is the capturing time per frame as defined according to a vertical frequency in the NTSC standard. The value of 9 frames is the total of one frame of data to be stored into one of the four memories 84 to 87 and eight frames for creating eight bits of space code data.

SUMMARY OF THE INVENTION

The present invention has at least one or two or more among the following objects:

It is a first object of the present invention to provide a small-sized, low-cost shape measuring device which can perform measurement without the need for an encoder by driving a scanning device at a high constant speed to scan an object surface, especially by rotating a polygon mirror at a high speed so as to scan plural times in a pickup time per frame, detecting a phase of rotation of the polygon mirror, flashing laser light according to the phase detected, and accumulating images obtained by the plural-times scanning to obtain measurement data.

It is a second object of the present invention to provide a shape measuring device which can select the number of times of actually directing laser light onto an object from the number of times of scanning in storing images, thereby allowing proper measurement at both a bright portion and a dark portion of the object.

It is a third object of the present invention to provide a shape measuring device which can improve the precision of measurement by preliminarily calibrating an error of a deflection angle of laser light and computing position coordinates considering the correction of the error.

It is a fourth object of the present invention to provide a shape measuring device which can uniform a space resolution and a luminance by controlling the flashing intervals of laser light so that a space code on a measurement reference plane is divided at equal intervals to thereby simplify arithmetic processing.

It is a fifth object of the present invention to provide a shape measuring device which can reduce a necessary memory capacity by performing logic operation to store plural frames of space code data into one memory and calculate necessary values.

It it a sixth object of the present invention to provide a shape measuring device which can reduce a necessary amount of computation to shorten a measurement time by providing a memory preliminarily storing values of z corresponding to all values of x and θ and reading necessary values of z from this memory.

DISCLOSURE OF THE INVENTION

According to the present invention, the following configurations are provided.

(1) A shape measuring device having a laser light source for generating flashing laser light, a scanning device for deflecting the laser light toward an object placed on a measurement plane to scan the object, and image pickup means for picking up an image formed on the object by scanning of the laser light; the shape measuring device comprising driving means for driving the scanning device so that the scanning of the laser light by the scanning device over a measurement range is performed at least once in a pickup time per frame of the image pickup means; a pattern memory preliminarily storing plural kinds of flash patterns of the laser light; flash control means for controlling flashing of the laser light from the laser light source with reference to a phase of scanning by the scanning device according to one of the flash patterns stored in the pattern memory; and shape computing means for computing a shape of the object according to image data obtained by the image pickup means.

In this shape measuring device, the scanning device is driven by the driving means to scan the object with the laser light at least once in the pickup time per frame of the image pickup means. The flash control means controls the laser light source to flash the laser light with reference to the phase of scanning by the scanning device. At this time, the flashing follows one of the flash patterns stored in the pattern memory. Since the laser light is deflected toward the object by the scanning device, an image is formed on the surface of the object, and this image is picked up by the image pickup means. Then, the shape computing means computes the shape of the object according to image data obtained by the image pickup means, thereby performing the shape measurement.

(2) A shape measuring device having a laser light source for generating flashing laser light, a polygon mirror for deflecting the laser light toward an object placed on a measurement plane to scan the object, and image pickup means for picking up an image formed on the object by scanning of the laser light; the shape measuring device comprising driving means for driving the polygon mirror so that the scanning of the laser light by the polygon mirror over a measurement plane is performed plural times in a pickup time per frame of the image pickup means; a pattern memory preliminarily storing plural kinds of flash patterns of the laser light; phase reference signal generating means for detecting a phase of rotation of the polygon mirror and generating a phase reference signal when the phase becomes a specific phase; flash control means for controlling flashing of the laser light from the laser light source with reference to the phase reference signal generated from the phase reference signal generating means according to one of the flash patterns stored in the pattern memory; pattern changing means for changing the flash pattern followed by the flash control means when the pickup time per frame of the image pickup means has elapsed; and shape computing means for computing a shape of the object according to image data obtained by the image pickup means.

In this shape measuring device, the polygon mirror is driven by the driving means to rotate at a high speed such that the laser light can scan the object plural times in the pickup time per frame of the image pickup means. The phase reference signal generating means detects the phase of rotation of the polygon mirror and generates a phase reference signal when the phase becomes a specific phase. The flash control means receives this phase reference signal and controls the laser light source to flash laser light with reference to this phase reference signal. At this time, the flashing follows one of the flash patterns stored in the pattern memory. Since the laser light is deflected toward the object by the rotating polygon mirror, an image is formed on the surface of the object, and this image is picked up by the image pickup means. When the phase becomes a specific phase after completion of the first scanning of the laser light by the rotation of the polygon mirror, the phase reference signal is generated again from the phase reference signal generating means. Accordingly, the laser light is flashed in the second scanning according to the same flash pattern as that in the first scanning. Thereafter, when one frame is completely picked up by the image pickup means, the flash pattern followed by the flash control means is changed by the pattern changing means to restart picking up an image by using a new flash pattern. Then, the shape computing means computes the shape of the object according to image data obtained by the image pickup means, thereby performing the shape measurement.

Accordingly, it is possible to provide a small-sized, low-cost shape measuring device which can perform measurement without the need for an encoder by driving a scanning device at a high constant speed to scan an object surface.

In the configuration (2) mentioned above, it is preferable that the shape measuring device further comprises light quantity adjusting means for setting the number of times of scanning for actually directing the laser light onto the object in the plural times of scanning performed in the pickup time per frame of the image pickup means.

In this case, the number of times of scanning for actually directing the laser light onto the object in the number of plural times of scanning performed in the pickup time per frame of the image pickup means is set by the light quantity adjusting means.

Accordingly, the measurement can be properly made with a light quantity according to the brightness of the object. That is, the shape measurement can be properly made at both a bright portion and a dark portion of the object by adjusting the light quantity of the scanning laser light rather than by controlling an output from the laser light source itself.

(3) A shape measuring device having a laser light source for generating flashing laser light, a lens system for shaping the laser light into a slit-shaped beam, a scanning device for deflecting the laser light shaped into the slit-shaped beam toward an object placed on a measurement plane to scan the object, and image pickup means for picking up a stripe pattern formed on the object by scanning of the laser light; the shape measuring device comprising driving means for driving the scanning device so that the scanning of the laser light by the scanning device over a measurement range is performed at least once in a pickup time per frame of the image pickup means; drive timing means for adjusting generation of a drive signal from the driving means so as to correct a nonlinear relation between the drive signal and an actual deflection angle of the scanning device; a pattern memory preliminarily storing plural kinds of flash patterns of the laser light; flash control means for controlling flashing of the laser light from the laser light source with reference to a phase of scanning by the scanning device according to one of the flash patterns stored in the pattern memory; and shape computing means for computing a shape of the object according to image data obtained by the image pickup means.

In this shape measuring device, the flashing laser light generated from the laser light source is shaped into a slit-shaped beam by the lens system, and the slit-shaped beam is deflected toward the object by the scanning device to scan the object surface. The scanning device is driven by the driving means so as to scan at least once over the measurement range in the pickup time per frame of the image pickup means. Accordingly, a stripe pattern is formed on the object surface by the scanning of the slit-shaped beam of flashing laser light, and this stripe pattern is picked by the image pickup means. At this time, the generation of a drive signal from the driving means is adjusted by the drive timing means so that the nonlinear relation between the drive signal and the actual deflection angle of the scanning device is corrected to thereby realize an ideal motion of the scanning device. Then, the shape computing means computes the shape of the object according to the image data from the image pickup means and the actual deflection angle data.

Accordingly, the precision of the deflection angle of the scanning device can be improved to thereby perform high-precision shape measurement.

In the configuration (3) mentioned above, it is preferable that the drive timing means calculates a correction quantity for the drive signal from the image data obtained by the image pickup means when measurement is made on the measurement plane perpendicular to an optical axis of the image pickup means in a condition where the object is absent on the measurement plane.

In this case, calibration of the drive signal is preliminarily made by using image data obtained by performing background measurement. Accordingly, high-precision shape measurement can be performed in accordance with measurement conditions.

Further, in the configuration (3) mentioned above, it is preferable that the shape measuring device further comprises flash timing means for controlling the flashing of the laser light from the laser light source so that the stripe pattern formed on the object by the laser light is divided at equal intervals on the measurement plane perpendicular to the optical axis of the image pickup means; wherein the shape computing means computes position coordinates in a spatial coordinate system from the image data and deflection angle data to decide the shape of the object.

In this case, the flashing of the laser light is controlled by the flash timing means so that the stripe pattern is divided at equal intervals on the measurement plane, and position coordinates in a spatial coordinate system are computed by the shape computing means according to the image data and the deflection angle data.

Accordingly, a constant space resolution over the measurement range can be obtained, and data computation can be easily made to thereby reduce a computation time required in the shape computing means.

In the case where the flash timing means is provided, it is preferable that the flash timing means decides the flash pattern providing the equal intervals of the stripe pattern on the measurement plane from the image data obtained by the image pickup means when measurement is made on the measurement plane in a condition where the object is absent on the measurement plane.

In this case, calibration of the flash pattern is preliminarily made by using image data obtained by performing background measurement to thereby optimize the flash pattern. Accordingly, high-precision shape measurement can be performed in accordance with measurement conditions.

Further, in the case where the flash timing means is provided, it is preferable that the shape measuring device further comprises flash pattern changing means for changing the flash pattern of the laser light from the laser light source every time the scanning is performed; and image data storing means capable of storing plural frames of image data obtained by the image pickup means; wherein the shape computing means computes the shape of the object according to the plural frames of image data picked up with different flash patterns.

In this case, the flash pattern of the laser light from the laser light source is changed by the flash pattern changing means every time the scanning is performed, and plural frames of image data obtained by using different flash patterns are stored into the image data storing means. Then, the shape computing means computes the shape of the object according to the plural frames of image data and the corresponding deflection angle data.

Accordingly, the shape of the object can be computed with high precision according to different plural pieces of image data. In this case, it is preferable that the flash pattern changing means changes the flash pattern of the laser light from the laser light source according to a gray code. The use of the gray code can eliminate the occurrence of an undue carry error component due to noise.

(4) A shape measuring device having a laser light source for generating flashing laser light, a scanning device for deflecting the laser light toward an object placed on a measurement plane to scan the object, and image pickup means for picking up an image formed on the object by scanning of the laser light; the shape measuring device comprising binarizing means for binarizing the image data obtained by the image pickup means; storing means for storing the image data binarized by the binarizing means as space code data; updating means for performing logic operation between data newly supplied from the binarizing means and data already stored in the storing means to thereby update storage contents of the storing means; coordinate data generating means for generating coordinate data according to positions on a pickup plane of the image pickup means; driving means for driving the scanning device so that the scanning of the laser light by the scanning device over a measurement range is performed at least once in a pickup time per frame of the image pickup means; a pattern memory preliminarily storing plural kinds of flash patterns of the laser light; flash control means for controlling flashing of the laser light from the laser light source with reference to a phase of scanning by the scanning device according to one of the flash patterns stored in the pattern memory; and shape computing means for computing a shape of the object according to the space code data and the coordinate data.

In this shape measuring device, the laser light generated from the laser light source is deflected toward the object by the scanning device to scan the object surface. Accordingly, an image in one frame is formed on the object surface by the scanning of the laser light, and this image is picked up by the image pickup means. The image data obtained by the image pickup means is binarized by the binarizing means, and is then stored as space code data into the storing means. When an image in the next frame is picked up by the image pickup means, the updating means performs logic operation between data newly binarized by the binarizing means and data already stored in the storing means to update the storage contents of the storing means. Then, the coordinate data generating means generates coordinate data according to positions on the pickup plane of the image pickup means, and the computing means computes height values according to the space code data and the coordinate data.

Accordingly, plural frames of data can be stored by the storing means having a memory capacity corresponding to one frame of data, thus reducing a necessary memory capacity.

(5) A shape measuring device having a laser light source for generating flashing laser light, a scanning device for deflecting the laser light toward an object placed on a measurement plane to scan the object, and image pickup means for picking up an image formed on the object by scanning of the laser light; the shape measuring device comprising binarizing means for binarizing the image data obtained by the image pickup means; storing means for storing the image data binarized by the binarizing means as space code data; coordinate data generating means for generating coordinate data according to positions on a pickup plane of the image pickup means; converting means preliminarily storing height values corresponding to all space code data and all coordinate data; driving means for driving the scanning device so that the scanning of the laser light by the scanning device over a measurement range is performed at least once in a pickup time per frame of the image pickup means; a pattern memory preliminarily storing plural kinds of flash patterns of the laser light; flash control means for controlling flashing of the laser light from the laser light source with reference to a phase of scanning by the scanning device according to one of the flash patterns stored in the pattern memory; and shape computing means for reading the height values from the converting means according to the space code data and the coordinate data to thereby compute the shape of the object.

In this shape measuring device, the laser light generated from the laser light source is deflected toward the object by the scanning device to scan the object surface. Accordingly, an image in one frame is formed on the object surface by the scanning of the laser light, and this image is picked up by the image pickup means. The image data obtained by the image pickup means is binarized by the binarizing means, and is then stored as space code data into the storing means. When an image in the next frame is picked up by the image pickup means, the updating means performs logic operation between data newly binarized by the binarizing means and data already stored in the storing means to update the storage contents of the storing means. Then, the coordinate data generating means generates coordinate data according to positions on the pickup plane of the image pickup means, and the computing means reads the height values from the converting means according to the space code data and the coordinate data.

Accordingly, it is unnecessary to perform arithmetic processing on software by triangulation, but necessary values can be read out by hardware processing to thereby perform the shape measurement at a greatly high speed.

In the configuration (5) mentioned above, it is preferable that the shape measuring device further comprises updating means for performing logic operation between data newly supplied from the binarizing means and data already stored in the storing means to thereby update storage contents of the storing means.

In this case, plural frames of data can be stored by the storing means having a memory capacity corresponding to one frame of data, thus reducing a necessary memory capacity.

BRIEF DESCRIPTION OF THE DRAWINGS

FIG. 2 is a table showing flash patterns stored in a pattern memory shown in FIG. 1;

DETAILED DESCRIPTION OF THE PREFERRED EMBODIMENTS

A detailed description of preferred embodiments of shape measuring device embodying the present invention will now be given referring to the accompanying drawings.

(First Preferred Embodiment)

Figure 1:
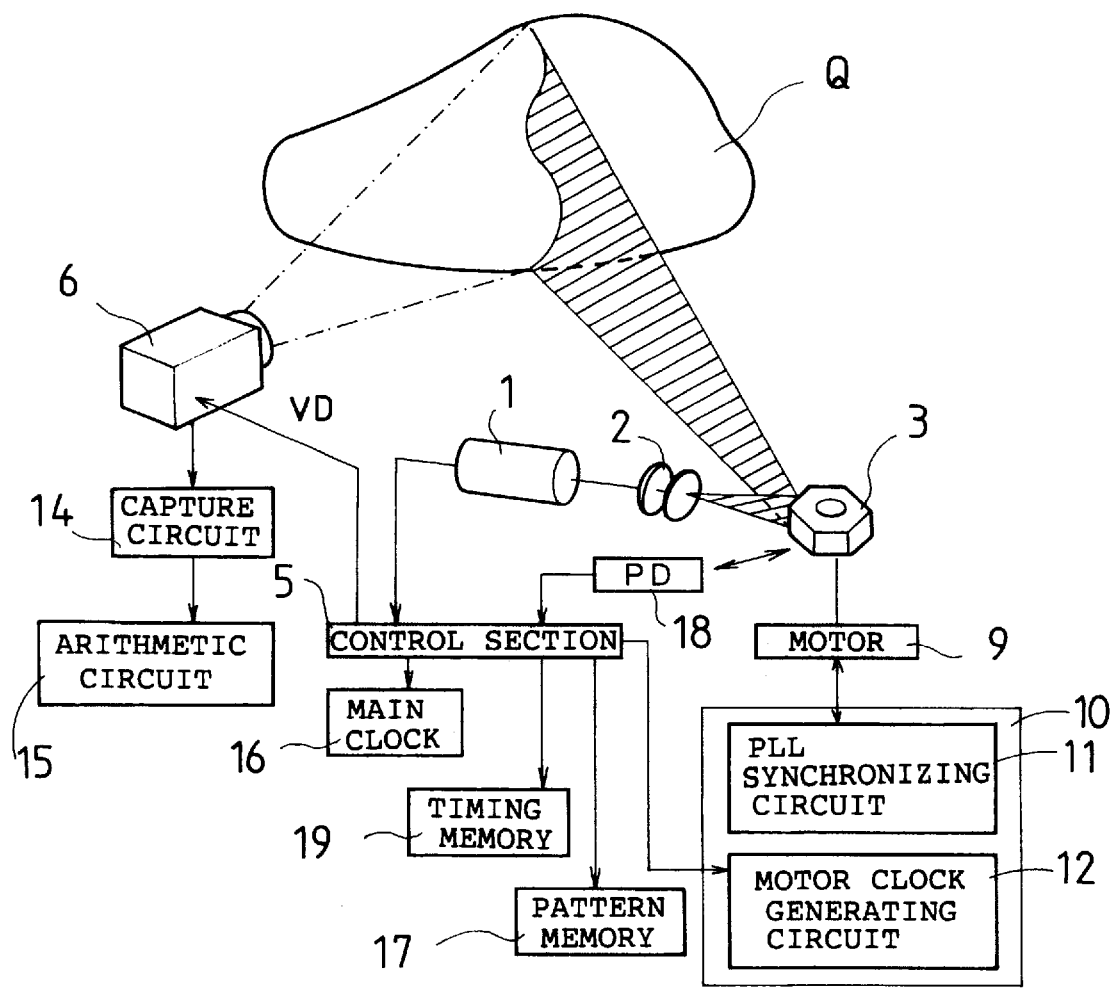
FIG. 1 is a schematic view illustrating a shape measuring device according to a first preferred embodiment of the present invention.

FIG. 1 shows a schematic configuration of a shape measuring device according to a first preferred embodiment of the present invention. The shape measuring device includes a laser light source 1 for generating laser light, a lens system 2 for shaping the laser light generated from the laser light source 1 into a slit-shaped beam, a polygon mirror 3 for reflecting the laser light shaped into the slit-shaped beam and directing the laser light reflected onto an object Q whose shape is to be measured so as to scan the object Q by a rotational motion, and a CCD camera 6 for picking up an image formed by directing the laser light onto the object Q.

The laser light source 1 may be any known laser light source such as semiconductor laser, gas laser, solid laser, or liquid laser; however, the semiconductor laser is the most suitable of all lasers from the viewpoints that it allows size reduction and high-speed switching. The laser light source 1 is controlled by a control section 5 to emit flashing light.

The control section 5 is a microcomputer for controlling the shape measuring device, and is constructed by combining a CPU, ROM, RAM, etc. known in the art. The ROM preliminarily stores various programs necessary for the control. The control section 5 is provided with a main clock 16, a pattern memory 17, and a timing memory 19 for performing flash control of the laser light source 1.

The pattern memory 17 preliminarily stores an 8-digit gray code as shown in FIG. 2. Data "0" of this code means a dark state, and data "1" means a bright state. Every time a pulse is generated from the main clock 16, the dark and bright states are changed in the order of memory addresses 0 to 255 according to one of memory bits 0 to 7, thereby forming a flash pattern. However, any codes having regularity other than the gray code may be stored in the pattern memory 17. For example, a binary code may also be considered. The shape measuring device may employ any codes having regularity and capable of identifying a space code. However, the gray code is superior to any other codes in the point that a carry error due to noise is small because only one bit is always inverted from the bright state to the dark state or vice versa when shifting from a certain bright/dark pattern to the next bright/dark pattern.

The timing memory 19 serves to govern the synchronization of flashing so that the intervals of flashing become equal to each other on a measurement plane. The main clock 16 has a frequency of about several megahertz.

The control section 5 serves also to supply a video vertical synchronizing signal (which will be hereinafter referred to as "VD signal") to the CCD camera 6. The VD signal is also used to change the memory bit (0 to 7) to be actually used for the flash control, of the bright/dark data stored in the pattern memory 17. The VD signal is also fed to a motor drive circuit 10 to be hereinafter described.

The CCD camera 6 is provided with a capture circuit 14 and an arithmetic circuit 15. The capture circuit 14 is an A/D converter for digitizing and capturing an image picked up by the CCD camera 6 according to the VD signal supplied from the control section 5 to the CCD camera 6. The arithmetic circuit 15 serves to compute the shape of the object Q by triangulation according to data digitized by the capture circuit 14. The details of the arithmetic circuit 15 will be hereinafter described. The CCD camera 6 has a video rate of 1/60 second, that is, picks up 60 fields of images per second. In the case of using the CCD camera 6 in a much background light environment, a filter may be desirably placed in front of the CCD camera 6 to prevent the entry of the background light as a noise component into the CCD camera 6.

The polygon mirror 3 has 6 mirror faces in this preferred embodiment; however, the number N of mirror faces is not limited to 6, but any one of 4 to 24 mirror faces may be used. The number N of mirror faces is related with an irradiation angle θ of the scanning laser light by the following expression.

$$\theta = 720/N \, (°)$$

It is sufficient to set the irradiation angle θ to about 45° to 90°, so that the suitable number of mirror faces is in the range of 8 to 16. Actually, any one of 8, 12, and 16 mirror faces may be selected in consideration of ease of fabrication of the polygon mirror 3 itself. In this case, the irradiation angles θ corresponding to the 8, 12, and 16 mirror faces are 90°, 60°, and 45°, respectively, and the laser light scans over these irradiation angles by rotating the polygon mirror 3 at 360/N°.

The polygon mirror 3 is provided with a motor 9 as a drive source for performing the rotational motion of the polygon mirror 3. The polygon mirror 3 and the motor 9 are connected together at a rotational ratio of 1:1, not through any speed reducing means such as gears. The motor 9 is controlled by a motor drive circuit 10 including a PLL synchronizing circuit 11 and a motor clock generating circuit 12, thereby rotating at a fixed speed.

The motor clock generating circuit 12 is supplied with a VD signal from the control section 5 to generate a motor clock perfectly synchronized with the VD signal. The PLL synchronizing circuit 11 uses this motor clock to drive the motor 9. The motor clock has a frequency much lower than that of the main clock 16. In this preferred embodiment, the polygon mirror 3 is rotated at a fixed high speed so that the laser light scans many times in a storage time per frame of the CCD camera 6.

The polygon mirror 3 is further provided with a photodetector 18. The photodetector 18 has a light emitting device, a light sensor, and a pulse generating device. When light emitted from the light emitting device is reflected on the polygon mirror 3 and then enters the light sensor, the pulse generating device generates a pulse, thereby detecting a phase of each mirror face of the polygon mirror 3. This pulse (which will be hereinafter referred to as "PD signal") is transmitted to the control section 5. When each reflecting face of the polygon mirror 3 takes a specific angle with respect to the photodetector 18, the PD signal is generated.

That is, during one rotation of the polygon mirror 3, the PD signal is generated plural times equal to the number of mirror faces of the polygon mirror 3. This signal is used to reset a flash pattern every time the scanning of the laser light is completed.

Figure 3:
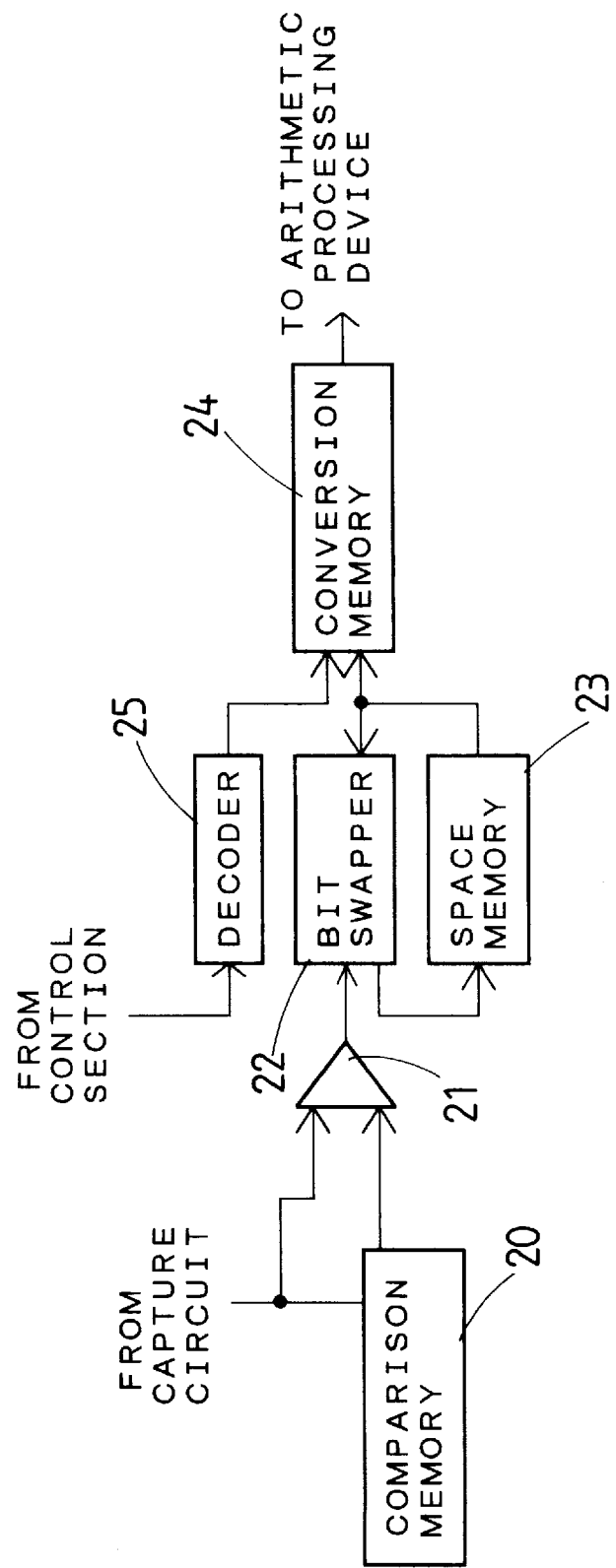
FIG. 3 is a block diagram of an arithmetic circuit shown in FIG. 1.

The arithmetic circuit 15 will now be described with reference to FIG. 3. A comparison memory 20 serves to store a threshold level used to binarize the pickup image data digitized by the capture circuit 14. The threshold is obtained selectively by capturing a negative pattern in which on and off of the laser irradiation are inverted, capturing a full irradiation pattern in which the light intensity of the laser is reduced to half of an ordinary intensity, or capturing a pattern in which the full irradiation pattern by the laser is picked up to reduce a luminance value. A digital comparator 21 serves to compare the digital data obtained from the capture circuit 14 and the threshold stored in the comparison memory 20. A binarized image data is obtained by the digital comparator 21.

A bit swapper 22 and a space memory 23 are provided on the output side of the digital comparator 21. The space memory 23 serves to store the image data binarized by the digital comparator 21 as space code data. The bit swapper 22 functions to interchange data at an arbitrary bit position between the data already stored in the space memory 23 and the data newly supplied from the digital comparator 21. This function allows the space memory 23 to store space code data corresponding to a plurality of frames.

A conversion memory 24 is a memory preliminarily storing the values of z corresponding to all values of x and $\theta$ in Eq. (1). As will be hereinafter described, when any values of x and $\theta$ are input, the corresponding value of z can be read from the conversion memory 24. A decoder 25 serves to supply a value corresponding to coordinate data (x) to the conversion memory 24 according to a position on an image pickup surface of the CCD camera 6.

The operation of the shape measuring device will now be described.

In the shape measuring device, the laser light source 1 is controlled by the control section 5 to emit flashing light. The flash pattern of the laser light is created according to the gray code stored in the pattern memory 17. That is, a bright/dark pattern is created by using the data of "0" and "1" in the order of the memory addresses of 0 to 255 according to one of the memory bits 0 to 7 shown in FIG. 2. The data "0" indicates a dark state, and the data "1" indicates a bright state. For example, according to the memory bit "0", the bright/dark pattern to be created is a pattern consisting of 256 bright and dark states, i.e., dark, bright, bright, dark, dark, bright, bright, dark, dark, . . . , dark states.

Figure 4:
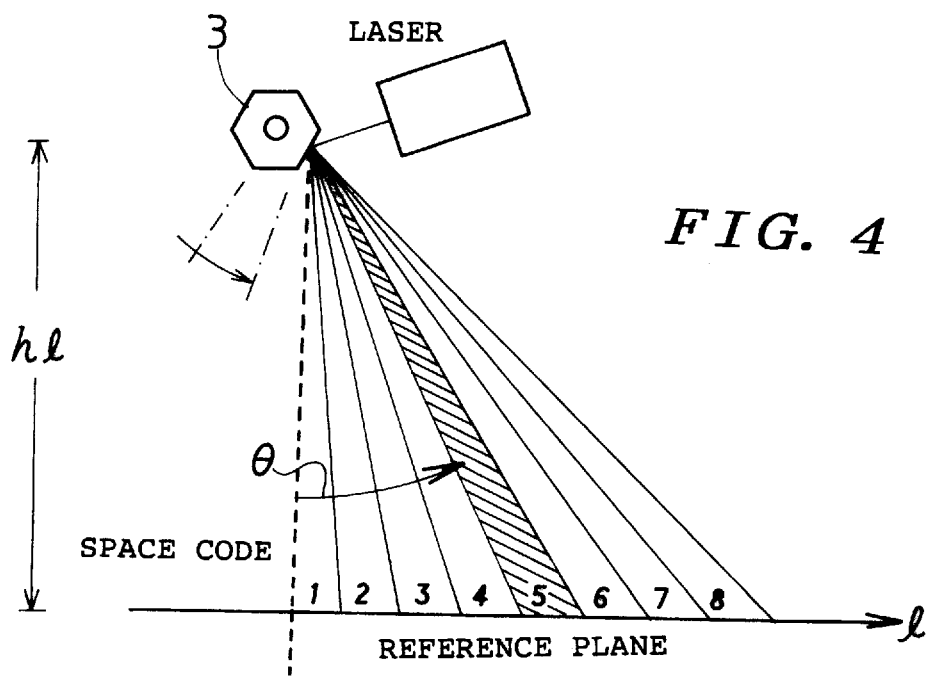
FIG. 4 is a view for illustrating a condition where laser light is flashed so that a space code is divided at equal intervals on a measurement reference plane.
Figure 5:
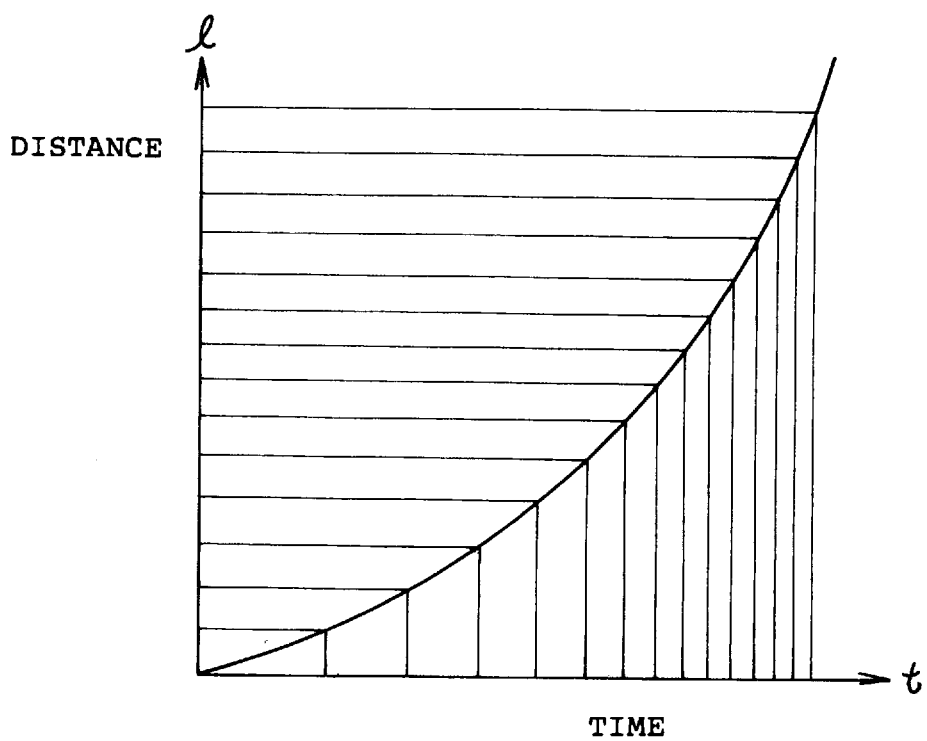
FIG. 5 is a graph showing the relation between a drive time of a scanning device with a triangular waveform and a distance from a reference point to irradiated positions on the measurement reference plane.
Figure 17:
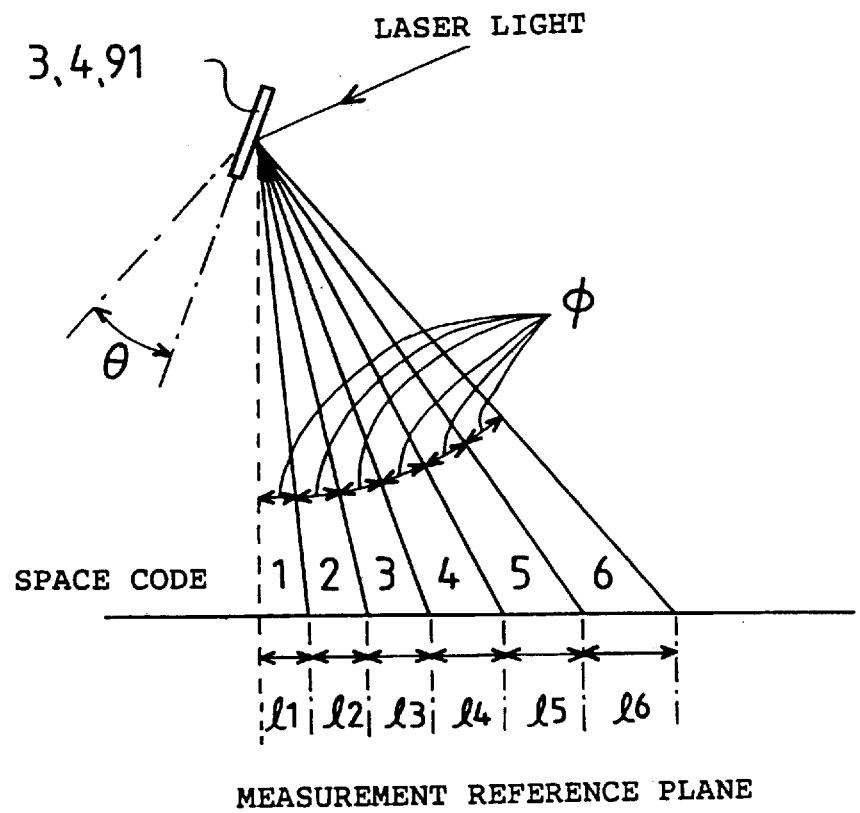
FIG. 17 is a view for illustrating a condition where deflection angles of flashing laser light are equal to each other and a space code is therefore divided at unequal intervals on a measurement reference plane in the prior art shape measuring device.

The flashing of the laser light is performed at intervals such that optimal space code data can be obtained. If the intervals of flashing of the laser light are timewise equal to each other, the lengthwise intervals on a measurement reference plane become unequal to each other as shown in FIG. 17, so that complicated numerical conversion is required to decide coordinates from image data. As a result, an optimal space code cannot be obtained, and a constant space resolution in a visual field. Under these circumstances, it is necessary to provide flashing intervals data that can obtain lengthwise equal intervals on the measurement reference plane as shown in FIG. 4. The distance 1 on the measurement reference plane as shown in FIGS. 4 and 17 is expressed by the following equation.

$$1 = hl \cdot \tan \theta \quad (2)$$

where hl denotes the distance from the polygon mirror 3 to the reference plane, and $\theta$ denotes the angle of deflection of the laser light. Accordingly, in order to obtain equal intervals of the distance 1 on the reference plane, the flashing intervals in a region where $\theta$ is large must be reduced. Such a relation is shown in FIG. 5, in which the vertical axis represents the distance 1 and the horizontal axis represents time t.

While the flashing intervals data can be theoretically calculated from the trigonometric function as shown in Eq. (2), the data is preferably set by calibration, which will be hereinafter described.

The flashing of the laser light in the above manner allows the measurement reference plane to be equally divided into $2^n$ such as 128, 256, or 512, and the bright or dark state is allocated to each divided section according to the flash pattern shown in FIG. 2, thereby forming a stripe pattern.

The flashing laser light is shaped into a slit-shaped beam by the lens system 2 to reach the polygon mirror 3, and is then reflected on the polygon mirror 3 toward the object Q. Since the polygon mirror 3 is rotated by driving the motor 9, the laser light reflected on the polygon mirror 3 scans the surface of the object Q to form a stripe pattern on the object Q according to the flash pattern. Then, the stripe pattern is picked up as an image by the CCD camera 6, and the image thus picked up is digitized and captured by the capture circuit 14. Then, the shape of the object Q is computed by the arithmetic circuit 15 according to the image data digitized above.

The relation between the pickup time of the CCD camera 6 and the rotating speed of the polygon mirror 3 will now be described. The pickup time of the CCD camera 6 depends on the VD signal, and it is set to 1/60 second per frame in this preferred embodiment. Accordingly, 60 frames per second are picked up. The rotating speed of the polygon mirror 3 is set to a high speed such that the scanning of the laser light is repeated plural times in the pickup time per frame of the CCD camera 6.

As an example, calculation of the rotating speed of the polygon mirror 3 will now be described in the case where the polygon mirror 3 has 12 mirror faces and the scanning of the laser light is repeated six times in the pickup time per frame. The rotating angle of the polygon mirror 3 required to perform the scanning once is 360°/12=30°. Accordingly, the rotating angle required to perform the scanning six times is 180°. That is, the polygon mirror 3 must be rotated 180°, i.e., by the half of one revolution in the pickup time of 1/60 second. Therefore, the rotating speed of the polygon mirror 3 is 30 revolutions per second, i.e., 1800 rpm. The rotation at this rotating speed is high-speed rotation enough to be regarded as constant-speed rotation that can neglect the fluctuations in rotating speed of the motor 9, such as wow and flutter or jittering. Thus, constant-velocity joint between the polygon mirror 3 and the motor 9 is allowed. Further, the number of times of the scanning in the pickup time per frame may be further increased to further increase the rotating speed of the polygon mirror 3.

In this manner, the scanning of the laser light is repeated plural times in the pickup time per frame of the CCD camera 6. At this time, the flash pattern is reset by the PD signal, and the same pattern is repeated every time to form the same stripe pattern on the object Q every time, with the result that the total of the stripe patterns identical with each other is picked up. Accordingly, there is no possibility that different stripe patterns may be superimposed in one frame.

Figure 6:
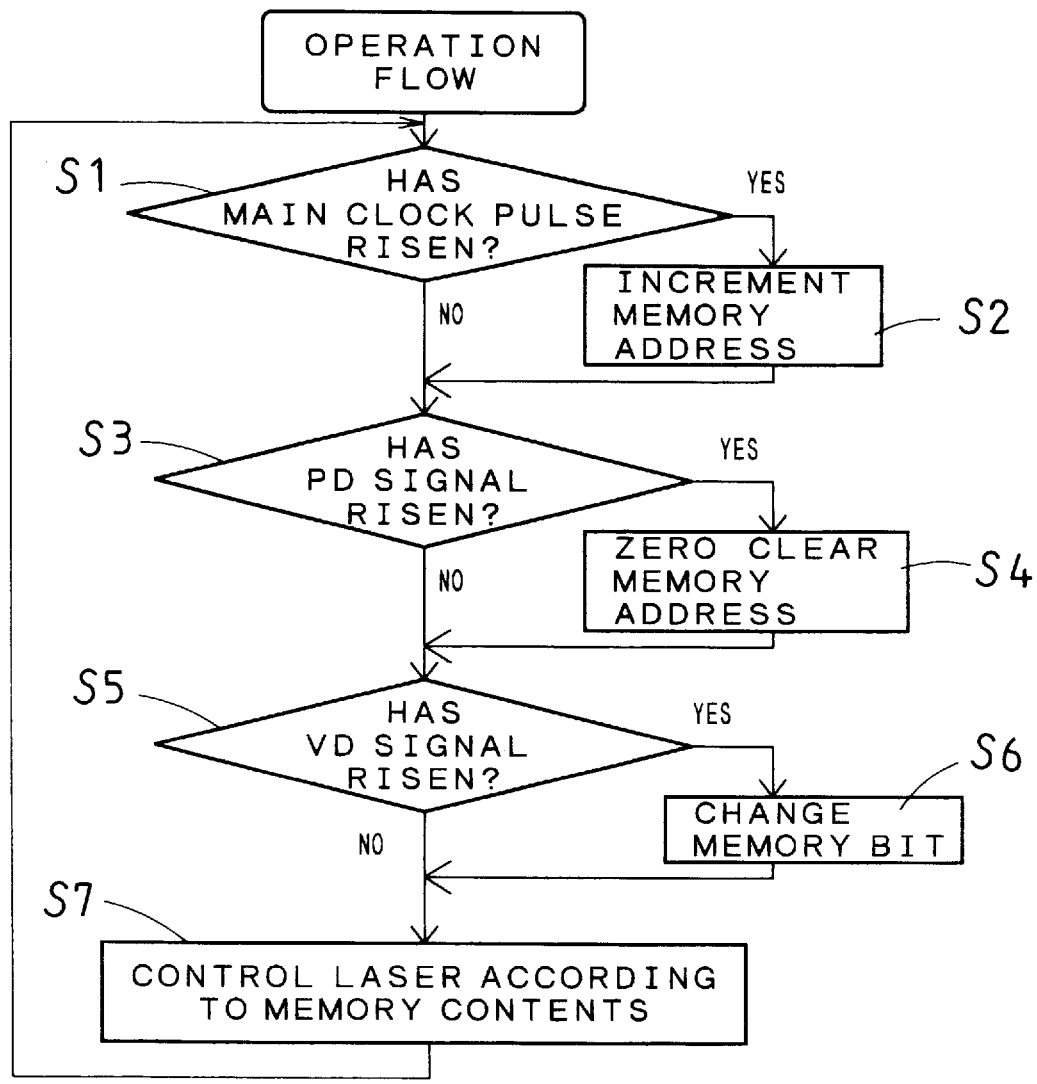
FIG. 6 is a flowchart showing the operation of the shape measuring device.

The flow of the operation of the shape measuring device will now be described with reference to FIG. 6. During measurement by the shape measuring device, the flashing of the laser light is controlled according to the contents of the pattern memory 17. That is, the pattern of the flashing is such that the dark state corresponds to data "0" and the bright state corresponds to data "1". Referring to FIG. 6, it is determined in S1 whether or not the pulse from the main clock 16 has risen. If the pulse from the main clock 16 rises (S1: Yes), the memory address (0 to 255) is incremented in S2, that is, the address number is increased by one. Since the frequency of the main clock 16 is on the order of several megahertz, the increment of the address is performed according to such a high frequency.

In S3, it is determined whether or not the PD signal has risen. If the PD signal rises (S3: Yes), the memory address is cleared to zero in S4, that is, the memory address is returned to zero irrespective of the address number to reset the flash pattern. Accordingly, the same flash pattern is subsequently repeated. Since the PD signal rises every time of scanning of the laser light, the same flash pattern is repeated every time the laser light scans.

In S5, it is determined whether or not the VD signal has risen. If the VD signal rises (S5: Yes), the memory bit (0 to 7) is changed in S6. Accordingly, another different flash pattern is subsequently used to perform the flashing of the laser light. The VD signal rises every time one frame is picked up by the CCD camera 6, so that when the pickup of one frame is completed, the next frame is picked up according to a new flash pattern.

In S7, the laser light source 1 is controlled according to the current data of the memory contents. That is, if the data is changed by any of S2, S4, and S6, the flashing of the laser light from the laser light source 1 is controlled according to the changed data. Thereafter, the program returns to S1 to repeat a similar operation.

Figure 7:
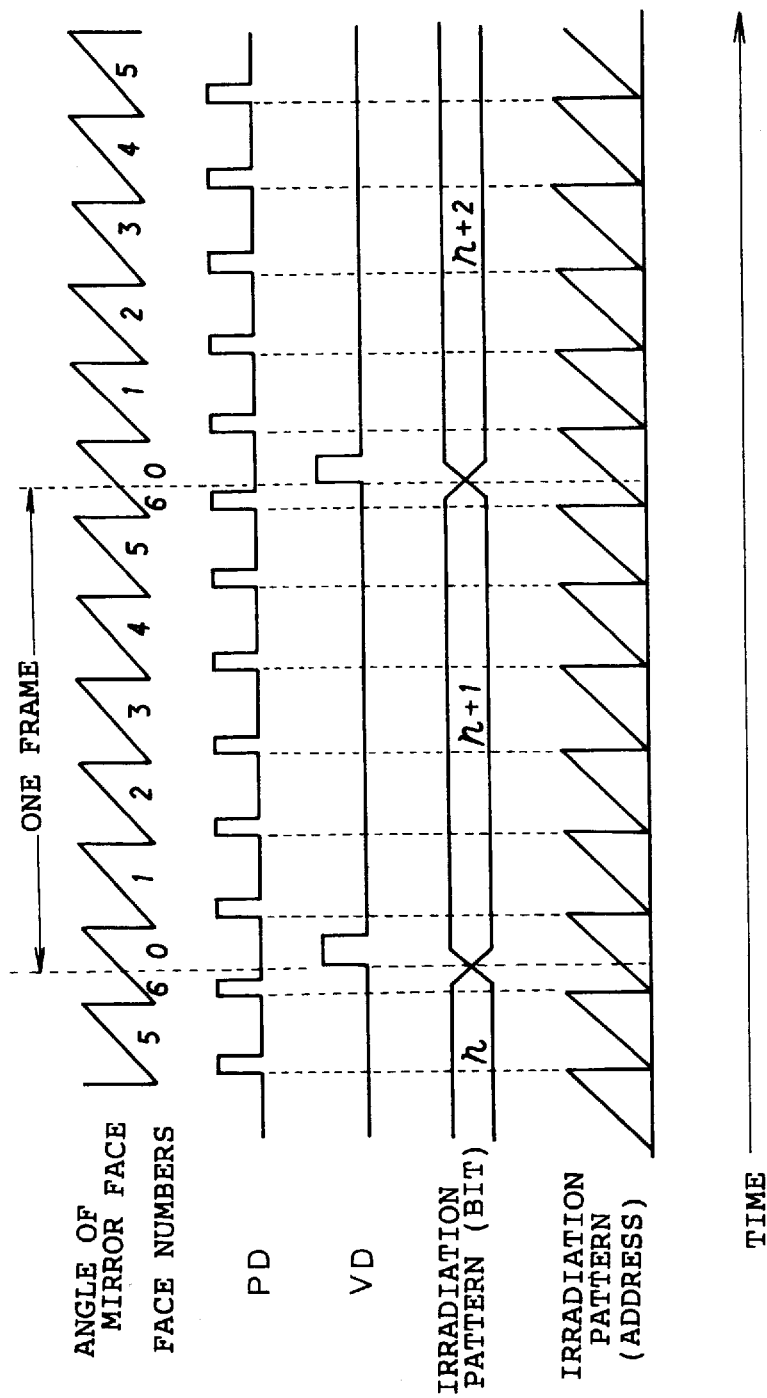
FIG. 7 is a timing chart showing an angle of each mirror face, various signals, etc. in the shape measuring device.

The relation between the angle of each mirror face of the polygon mirror 3, the PD signal, the VD signal, and the flash pattern in the shape measurement by the above-mentioned flow will now be described with reference to the timing chart shown in FIG. 7. This timing chart is shown in the case where the polygon mirror 3 has 12 mirror faces and the scanning of the laser light is repeated six times in the pickup time per frame. In FIG. 7, the horizontal axis represents time.

The angle of each mirror face and the face numbers shown at the first or uppermost row of the timing chart will be described. The angle of each mirror face means the angle of one of the reflecting faces of the polygon mirror 3 actually reflecting the laser light with respect to a reference angle. Since the polygon mirror 3 is rotated at a constant speed, the angle of each mirror face changes linearly during every scanning. Every time the laser light is reflected on one mirror face to complete one cycle of scanning, the laser light is then reflected on the next mirror face to restart the next cycle of scanning. Accordingly, the angle of the next mirror face changes similarly again from the reference angle. Thus, the change in the angle of each mirror face is shown by a saw-toothed waveform as shown. The face numbers (0 to 6) mean the numbers allocated to the mirror faces of the polygon mirror 3 used in the pickup time per frame of the CCD camera 6, but do not mean the number of all mirror faces of the polygon mirror 3.

The PD signal shown at the second row will be described. As mentioned above, this signal is generated when the angle of each reflecting face of the polygon mirror 3 becomes a specific angle with respect to the photodetector 18. That is, every time the scanning of the laser light is started, the PD signal rises. As apparent from FIG. 7, the PD signal rises every time each saw-toothed wave showing the change in the angle of each mirror face reaches a given height.

The VD signal shown at the third row will be described. As mentioned above, this signal governs the pickup operation of the CCD camera 6. That is, every time the frame is changed, the VD signal rises. Since the scanning is repeated six times in the pickup time per frame in this case, the pickup time per frame continues from the moment one VD signal rises to the moment the next VD signal rises. During the pickup time per frame, there are six saw-toothed waves showing the change in the angle of each mirror face. It is not always necessary to make the phases of the PD signal and the VD signal equal to each other.

The irradiation pattern (bit) shown at the fourth row will be described. This pattern shows the memory bit (0 to 7 in FIG. 2) of the data stored in the pattern memory 17 according to which the flashing operation of the laser light is performed. This pattern is changed in synchronism with the rising of the VD signal (see S6 in FIG. 6). Accordingly, in the case where a plurality of frames are continuously picked up by the CCD camera 6, different stripe patterns are picked up as different flashing patterns according to different memory bits.

The irradiation pattern (address) shown at the fifth row will be described. The memory address (0 to 255 in FIG. 2) is incremented at the time the main clock pulse rises (see S2 in FIG. 6). Since the frequency of the main clock is on the order of several megahertz and constant, the address number is linearly increased. Then, the address is cleared to zero in synchronism with the rising of the PD signal, and then restarts from zero (see S4 in FIG. 6). Accordingly, the pattern becomes a saw-toothed waveform having the same period as that of the saw-toothed waveform showing the change pattern of the angle of each mirror face, and the six times of scanning in the pickup time per frame are repeated with the same flashing pattern. Accordingly, there is no possibility that different stripe patterns as different flashing patterns may be superimposed on each other in one frame picked up by the CCD camera 6.

Figure 14:
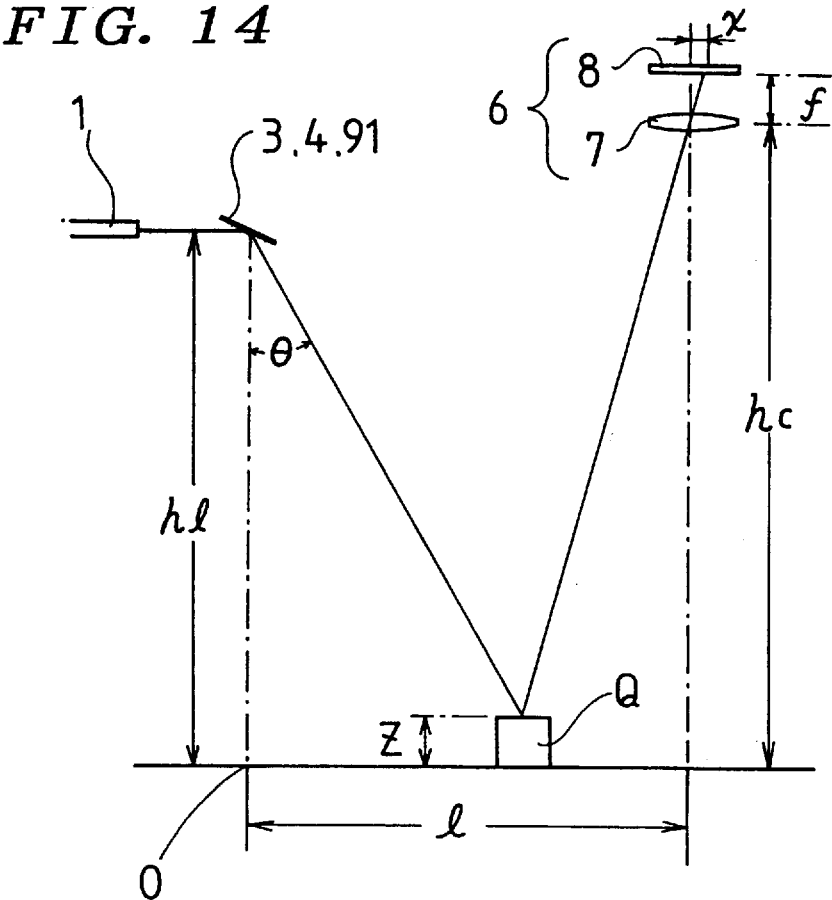
FIG. 14 is a view illustrating the concept of calculation of coordinates by triangulation.

The principle of calculation of the shape of the object Q by triangulation in the arithmetic circuit 15 will now be described in brief with reference to FIG. 14. As shown in FIG. 14, let hl denote the height of the polygon mirror 3 from the measurement reference plane (a plane perpendicular to the optical axis of the CCD camera 6), θ denote the angle of deflection of the laser light reflected on the polygon mirror 3, z denote the height of a laser irradiation position on the object Q from the measurement reference plane, hc denote the height of an objective lens 7 of the CCD camera 6 from the measurement reference plane, f denote the focal length of the objective lens 7, l denote the distance from a reference point 0 on the ms reference plane to the optical axis of the CCD camera 6, and x denote the position of a pixel detected on a photosensitive surface 8 of the CCD camera 6. Then, the height z can be expressed as follows:

$$z = \{x \cdot hc - f(1 - hl \cdot \tan\theta)\}/(x + f \cdot \tan\theta) \quad (1)$$

As apparent from FIG. 14, all of hc, f, l, and hl are fixed values not relational to the object Q. That is, if x and θ are given, z can be calculated from Eq. (1). Accordingly, if the values of θ corresponding to various values of x are given, the shape of the object Q can be obtained. The values of x represent the positions of pixels detected in the CCD camera 6, and they are read from the data digitized by the capture circuit 14. On the other hand, the values of θ represent the angles of irradiation of the scanning laser light reflected on the polygon mirror 3. Although the y-directional coordinate is not shown in FIG. 14, it may be directly obtained from the y-directional value of the position of each pixel detected in the CCD camera 6. Thus, three-dimensional measurement can be effected.

The calculation in the arithmetic circuit 15 is made in the following manner. The pickup image data in the CCD camera 6 digitized by the capture circuit 14 is compared with the threshold and is binarized by the digital comparator 21. As previously mentioned, the threshold is preliminarily obtained from the on-off inversion negative pattern, the intensity pattern, or the half-luminance pattern, and stored in the comparison memory 20.

The binarized data is stored as space code data through the bit swapper 22 into the space memory 23. The data on the initial pickup frame in the CCD camera 6 is stored as it stands into the space memory 23. However, the data on the subsequent pickup frames in the CCD camera 6 are subjected to the logic operation of the bit swapper 22. That is, when the binarized data is newly supplied from the digital comparator 21 to the bit swapper 22, the newly supplied data is overwritten on the corresponding address region in the space memory 23 to update the address region. More specifically, AND operation between the data already stored at the address region in the space memory 23 to be updated and zero data is carried out. Then, OR operation between the result of the AND operation and the newly supplied data is carried out, thereby updating the address region.

Thus, the data stored in the space memory 23 includes information corresponding to the angle of deflection of the laser light reflected on the polygon mirror 3, and this data is used as space code data.

Then, by using the space code data ($\theta$) stored in the space memory 23 and the corresponding coordinate data ($x$) supplied from the decoder 25 as an address, the value of the height $z$ of the object Q is read from the conversion memory 24. That is, the conversion memory 24 preliminarily stores the values of $z$ calculated by triangulation from all values of $x$ and all values of $\theta$. Accordingly, the shape of the object Q can be quickly measured by hardware only without the need for arithmetic processing on software. For example, the measurement requiring 4 minutes by software processing in personal computer or the like can be carried out within 0.15 second in this preferred embodiment. This measurement speed is much higher than that by any other rangefinder systems.

The calibration of the flashing intervals will now be described with reference to the flowchart shown in FIG. 8. In S81, a code pattern of a maximum memory resolution is written into the timing memory 19. The maximum memory resolution herein means a maximum resolution as a memory, and it is smaller than a pixel in the CCD camera 6. The code pattern to be written is arbitrary. In S12, laser irradiation is performed bit by bit. The laser irradiation is performed in synchronism with capturing of image data in the CCD camera 6 while driving the polygon mirror 3. The laser image generated is captured as luminance data by the CCD camera 6, and is binarized by the capture circuit 14 (S13).

In S14, it is determined whether or not eight bits of image data have been captured. If eight bits of image data have not yet been captured (S14: No), the program returns to S12, in which the capturing of image data is continued. If eight bits of image data have been captured (S14: Yes), the program proceeds to S15, in which it is determined whether or not data on the whole plane up to the maximum memory resolution have been captured. If the maximum memory resolution has not yet been reached (S15: No), the program returns to S12, in which the capturing of image data is continued. If the maximum resolution has been reached (S15: Yes), the program proceeds to S16.

In S16, a laser flashing correction table is created according to the data captured. Then, flashing intervals data according to this correction table are created and written into the timing memory 19 (S17). Thus, the flashing calibration is ended.

In this manner, the optimization of the flashing intervals of the laser light is completed. Thereafter, the object Q is placed on the reference plane to perform actual measurement, thereby allowing high-precision shape measurement according to the correction data obtained by the above calibration.

Figures 9, 11:
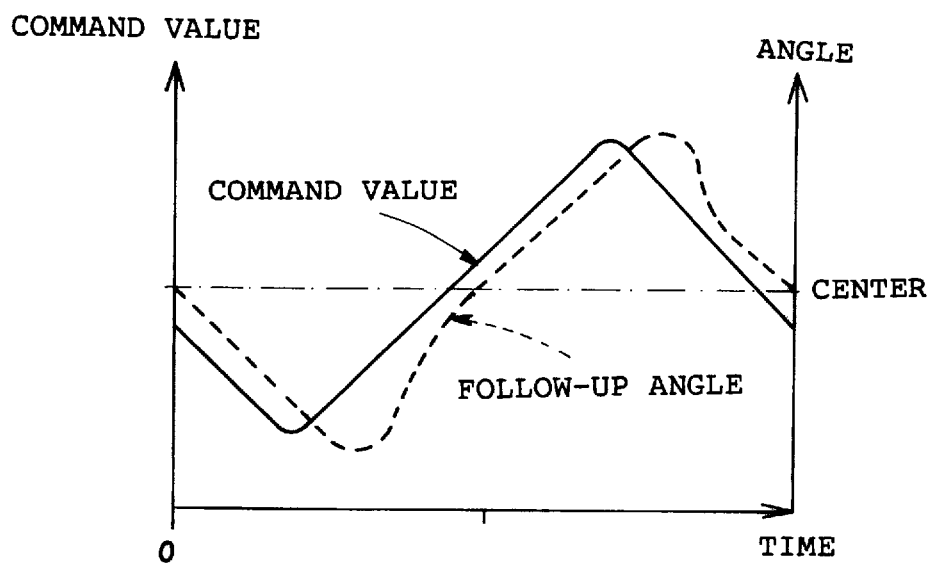
FIG. 9 is a table showing light quantity adjustment in the shape measuring device.
FIG. 11 is a graph showing the relation between a drive command to a scanning device and an actual follow-up angle of the scanning device in the case of considering correction.

Light quantity adjustment allowed by the shape measurement device according to this preferred embodiment will now be described. As described above, the scanning of the laser light is repeated plural times (e.g., six times in the case shown in FIG. 7) in the pickup time per frame of the CCD camera 6, and the same stripe patterns by the same flash patterns are accumulated in the pickup time per frame. Accordingly, the quantity of the laser light can be reduced by reducing the number of times of irradiation rather than irradiating the object Q every time the laser light scans. Further, the light quantity can be adjusted by selecting the number of times of irradiation. FIG. 9 shows an example of such light quantity adjustment in the case where the laser light scans six times in the pickup time per frame as shown in FIG. 7. As shown in FIG. 9, the light quantity can be adjusted to any one of six steps from 1/6 to 6/6 by changing the number of reflecting faces of the polygon mirror 3 to be used for irradiation in the pickup time per frame.

Accordingly, it is unnecessary to control the output from the laser light source 1 itself, but the light quantity can be adjusted in performing the shape measurement. That is, when the visual field is dark, the light quantity of 5/6 or 6/6 may be used, whereas when the visual field is bright, the light quantity of 1/6 or 2/6 may be used. Further, when a bright portion and a dark portion are both present in one visual field, the light quantity may be suitably used according to the respective portions, thereby allowing the creation of a pattern with a suitable brightness over the whole visual field.

In the shape measuring device according to the preferred embodiment as described above in detail, the polygon mirror 3 is provided with the photodetector 18, which generates a PD signal when the rotational angle of the polygon mirror 3 becomes a specific phase. The flash pattern of the laser light is reset by the PD signal, and the same flash pattern is repeated again. Accordingly, the scanning of the laser light can be repeated plural times in the pickup time per frame of the CCD camera 6, and the same stripe patterns can be picked up and accumulated in the pickup time per frame. Further, since the polygon mirror 3 is rotated at a high speed, the motor 9 can be driven at a high speed without the use of any speed reducing means such as gears.

Accordingly, the motor 9 can be operated at a high speed regarded as a constant speed that can neglect a speed fluctuating component, and high-precision rotation of the polygon mirror 3 precisely synchronized with the video rate of the CCD camera 6 can therefore be obtained without the use of any high-resolution encoder or the like. Thus, the shape measuring device with a high resolution can be realized by the use of the polygon mirror 3. Further, the quantity of the laser light can be adjusted by selecting the number of times of flashing irradiation of the laser light from the number of times of scanning of the laser light in the pickup time per frame of the CCD camera 6 rather than by controlling the output from the laser light source 1 itself. Thus, the shape measurement can be performed with a proper light quantity according to an extent of brightness of the visual field.

Further, the arithmetic circuit 15 is provided with the bit swapper 25 to perform logic operation between binary data newly supplied from the digital comparator 21 and data already stored in the space memory 23, thereby updating the contents of the space memory 23. Accordingly, it is unnecessary to provide many space memories. Further, the conversion memory 24 is provided to preliminarily store the values of z corresponding to all values of x and θ, so that the shape of the object Q can be measured by simply reading the values of z from the conversion memory 24 rather than by actually executing arithmetic processing on software, thereby reducing the measurement time. Accordingly, the high-speed shape measuring device applicable also to a vision system of a robot or the like can be realized with a small memory capacity.

Further, the timing memory 19 is provided to perform the calibration of laser flashing intervals and thereby measure the shape of the object Q at such flashing intervals that the bright and dark stripes by flashing are formed at equal intervals on a measurement reference plane. Accordingly, an optimum space code can be obtained, and the resolution can be made constant in the visual field. In addition, the burden to arithmetic elements in calculating three-dimensional coordinates to decide the shape can be reduced. As a result, the shape measurement of the object Q can be quickly performed with high precision.

It is to be noted that the present invention is not limited to the above preferred embodiment, but various changes and modifications may be made without departing from the scope of the present invention. For example, the numeric values used in the description of the above preferred embodiment are merely illustrative.

(Second Preferred Embodiment)

Figure 10:
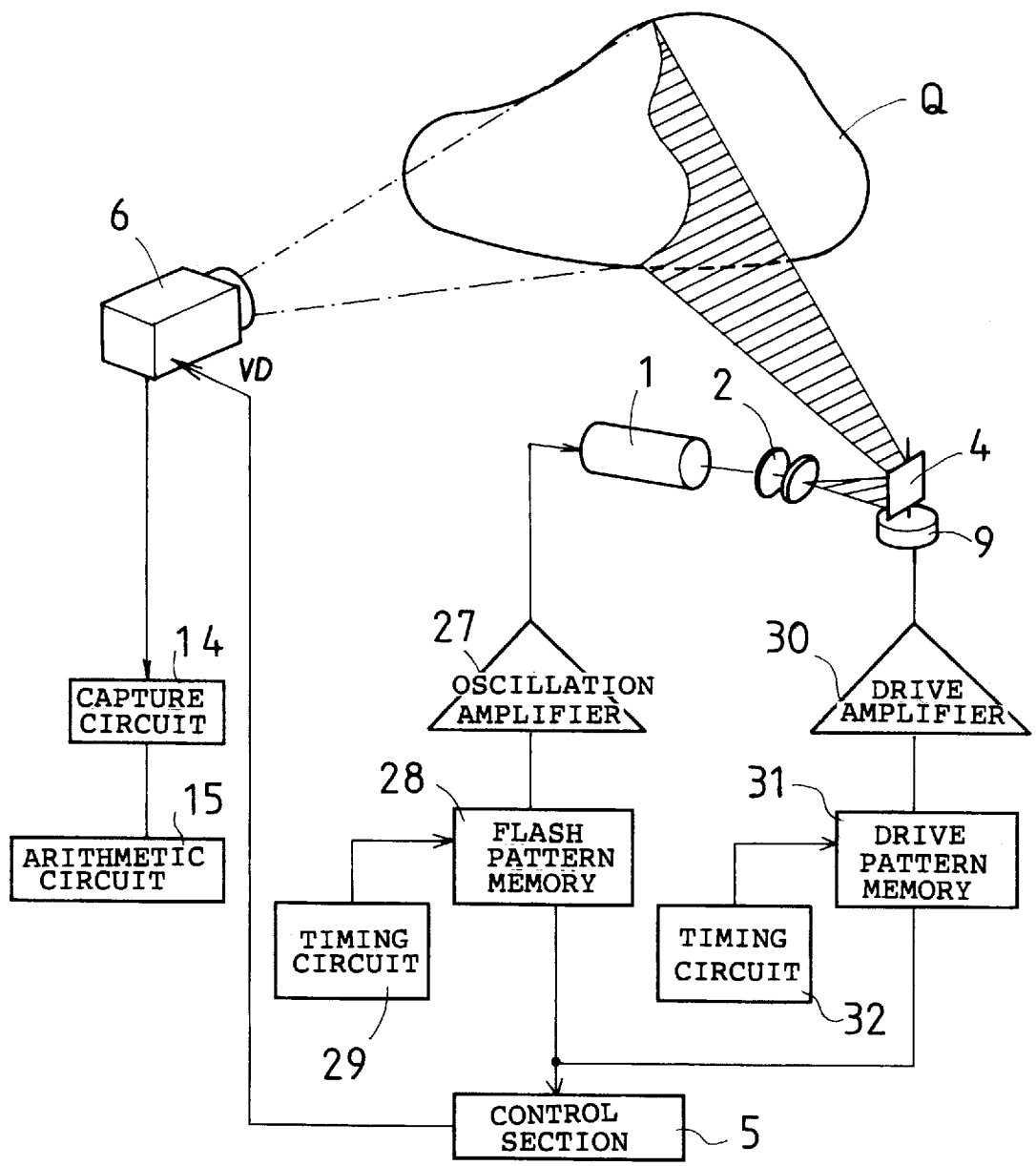
FIG. 10 is a schematic view illustrating a shape measuring device according to a second preferred embodiment of the present invention.

FIG. 10 schematically shows a shape measuring device according to a second preferred embodiment of the present invention. The shape measuring device according to the second preferred embodiment is similar to that according to the first preferred embodiment in the point that a laser light source 1, a lens system 2, and a CCD camera 6 are similarly provided. In the second preferred embodiment, a galvanomirror 4 is used instead of the polygon mirror 3 as a scanning device for deflecting the laser light to scan the object Q. The galvanomirror 4 is reciprocatingly driven by a motor 9.

A control section 5 as a microcomputer is provided to control the shape measuring device, and is constructed by combining a CPU, ROM, RAM, etc. known in the art. The ROM preliminarily stores various programs necessary for the control. The control section 5 is provided with an oscillation amplifier 27, a flash pattern memory 28, and a timing circuit 29. Further, the control section 5 is also provided with a drive amplifier 30, a drive pattern memory 31, and a timing circuit 32 to control the driving of the motor 9 for the galvanomirror 4. The control section 5 serves also to supply a VD signal to the CCD camera 6.

The CCD camera 6 is provided with a capture circuit 14 and an arithmetic circuit 15 similar to those in the first preferred embodiment.

The operation of the shape measuring device shown in FIG. 10 will now be described.

The basic operation of the shape measuring device in this preferred embodiment is similar to that in the first preferred embodiment. That is, the flashing laser light emitted from the laser light source 1 is reflected on the galvanomirror 4 as the scanning device to scan the surface of the object Q. As a result, a stripe pattern is formed on the object Q, and this pattern is picked up as image data by the CCD camera 6. Then, the image data is binarized by the capture circuit 14, and is computed by the arithmetic circuit 15 to measure the shape of the object Q.

In this preferred embodiment, the galvanomirror 4 is used as the scanning device, and is driven by the motor 9 to reciprocate angularly, thereby deflecting the laser light to scan the object Q.

The drive amplifier 30 applies a drive signal to the motor 9 so that the laser light scans over the measurement range in the pickup time per frame of the CCD camera 6. The timing circuit 32 generates a drive pattern reading signal in synchronism with an image capture timing of the CCD camera 6. The drive pattern memory 31 applies a drive command to the drive amplifier 30 according to this reading signal.

Figure 16:
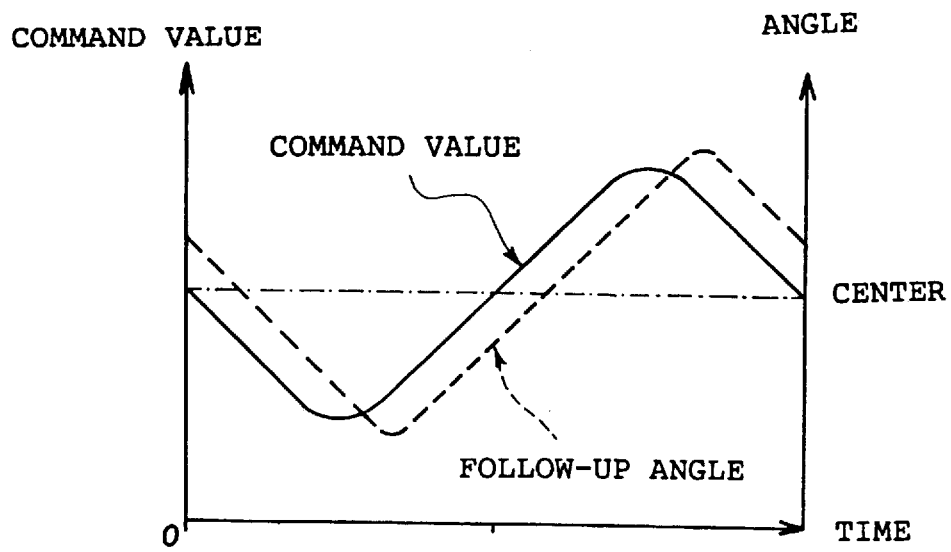
FIG. 16 is a graph showing the relation between a drive command to a scanning device and an actual follow-up angle of the scanning device in the prior art shape measuring device.
Figure 15:
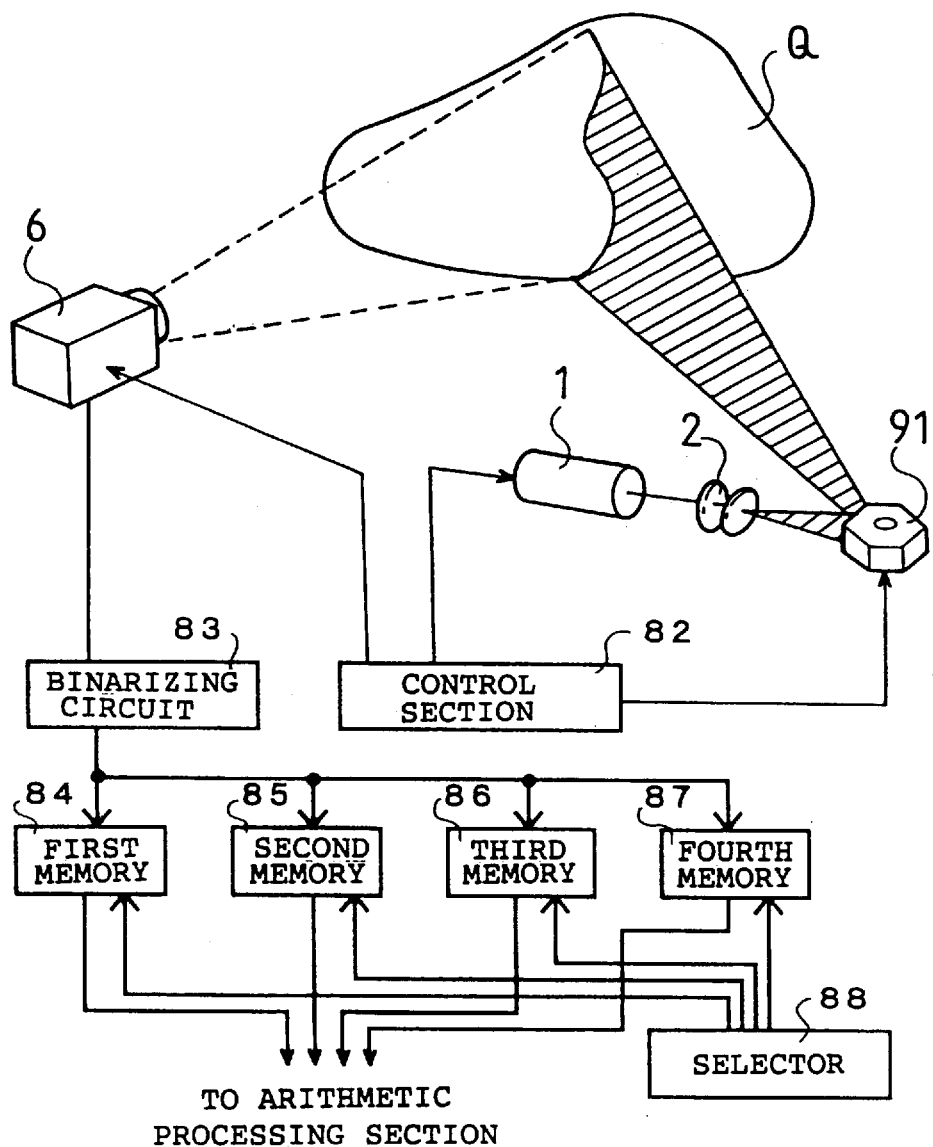
FIG. 15 is a schematic view illustrating a shape measuring device in the prior art.

The drive command is prepared from data preliminarily set by calibration. The reason for calibration is to necessitate the data for correcting the time lag of an actual follow-up angle of the galvanomirror 4 from a command value generated from the drive amplifier 30 as shown in FIG. 16. Further, it is necessary to preliminarily set such correction data by calibration, because it is difficult to theoretically properly obtain the time lag of the galvanomirror 4 because of a measurement frequency influence and an individual difference. A calibration method etc. will be hereinafter described.

FIG. 11 shows the relation between a drive command considering the correction for the time lag and an actual follow-up angle of the galvanomirror 4 following the drive command, in which a change in the follow-up angle describes a triangular waveform, for example. In FIG. 11, the horizontal axis represents time and the vertical axis represents angle as similar to those in FIG. 16. It is understood from FIG. 11 that the command value slightly leads so that the follow-up angle shown by a broken line becomes a preferable phase.

The reason why the triangular waveform is used for the follow-up angle is that the triangular waveform has an advantage such that the change in the deflection angle except at and near turning points is constant to facilitate timewise grasping of the deflection angle and that substantially the whole range between the turning points can be effectively used for measurement. However, since the galvanomirror 4 can be controlled with greatly high precision by the drive amplifier 30 etc., any waveforms other than the triangular waveform, such as a sine waveform, may be used for driving the galvanomirror 4.

In the case where any waveforms other than the triangular waveform are used, the following advantages and disadvantages are present. As one advantage, the influence of inertia of the galvanomirror 4 at the turning points can be reduced. In the case of a triangular waveform, an angular acceleration at each turning point is very large, so that it is difficult to completely eliminate the occurrence of overshoot or hunting in spite of the use of the drive command considering the correction. In FIG. 11, such overshoot is observed. The use of a sine waveform or the like can eliminate such an influence.

Figure 18:
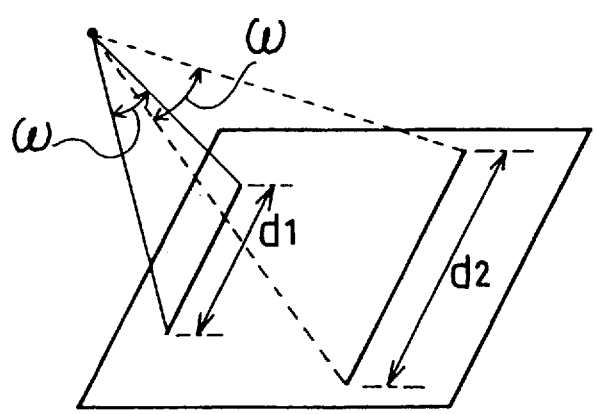
FIG. 18 is a view for illustrating a condition where the luminance of laser light is not constant in a visual field because of a difference in distance from a laser light source to different positions in the visual field in the prior art shape measuring device.

As another advantage, while the laser light is flashed so that a space code is equally divided on a measurement reference plane as will be hereinafter described, the luminance in a visual field subjected to measurement can be uniformed by using any waveforms other than the triangular waveform as the drive waveform. In the case of a triangular waveform, even when the spread angle ω of the slit-shaped laser light is constant as shown in FIG. 18, there is a difference between lengths $d_1$ and $d_2$ of the slit-shaped laser light due to a difference in distance from the galvanomirror 4 to different positions in the visual field. Accordingly, in order to make a luminance value to be captured by the CCD camera 6 constant in the visual field, the galvanomirror 4 must be driven with a waveform considering the above difference.

On the other hand, the disadvantages of any waveforms other than the triangular waveform are such that an effective range of measurement is narrow, and the timewise grasping of the deflection angle is troublesome because of a difference in angular velocity between near a turning point and near a middle point. As a result, the laser light cannot be effectively used for the measurement.

In actually performing the measurement, the above matters are considered to decide an optimum drive waveform. In the following description, a triangular waveform will be used for the measurement unless otherwise specified.

The flashing of the laser light is performed at such intervals that optimum space code data can be obtained as similar to the first preferred embodiment. That is, the flashing intervals are set so that the space code is equally divided on the measurement reference plane as previously described with reference to FIGS. 4 and 5.

Figure 12:
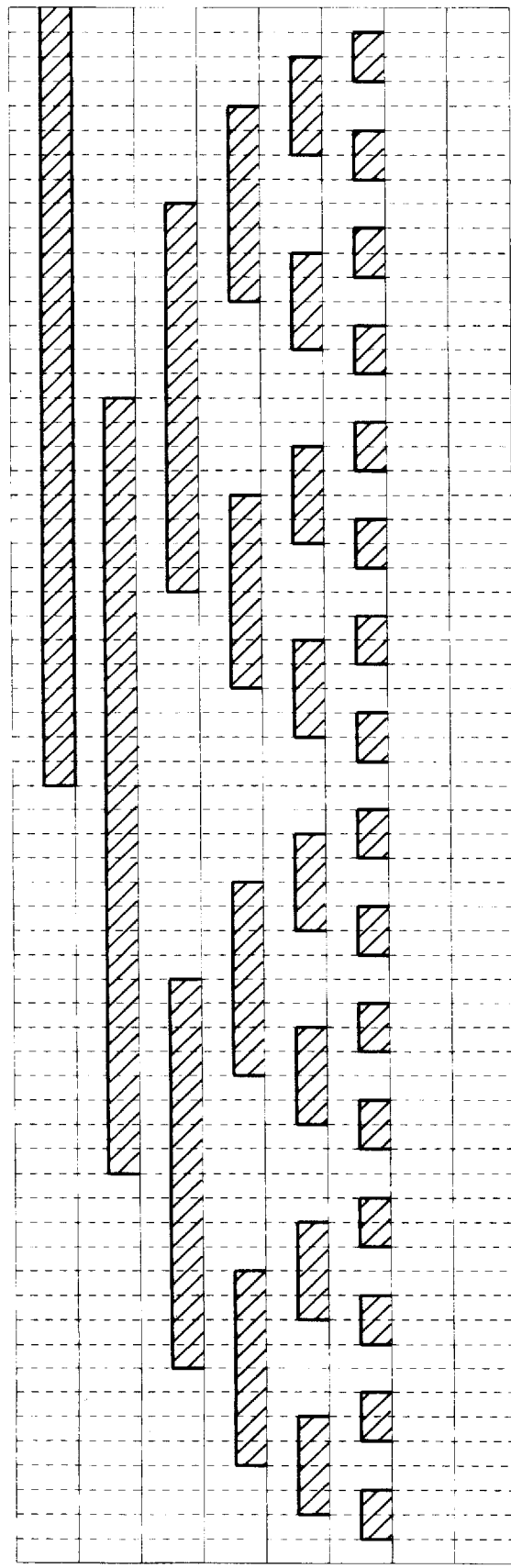
FIG. 12 is a view showing a gray code.

A bright/dark pattern obtained by such flashing is changed according to the gray code shown in FIG. 12. However, any codes having regularity other than the gray code may be used. For example, a binary code may also be considered. The shape measuring device may employ any codes having regularity and capable of identifying a space code. However, the gray code is superior to any other codes in the point that a carry error due to noise is small because only one bit is always inverted from the bright state to the dark state or vice versa when shifting from a certain bright/dark pattern to the next bright/dark pattern. Further, the flashing intervals can be adjusted on the order of several megahertz in this shape measuring device. From these points of view, the method using the gray code is superior to a mechanical method.

The calibration required before performing the shape measurement by using the shape measuring device will now be described. As mentioned above, the calibration is performed to optimize the drive pattern of the galvanomirror 4 and the flash pattern of the laser light. The measurement for calibration is made to a reference plane on which the object Q is not placed. The reference plane is a plane perpendicular to the optical axis of the CCD camera 6.

Figure 13:
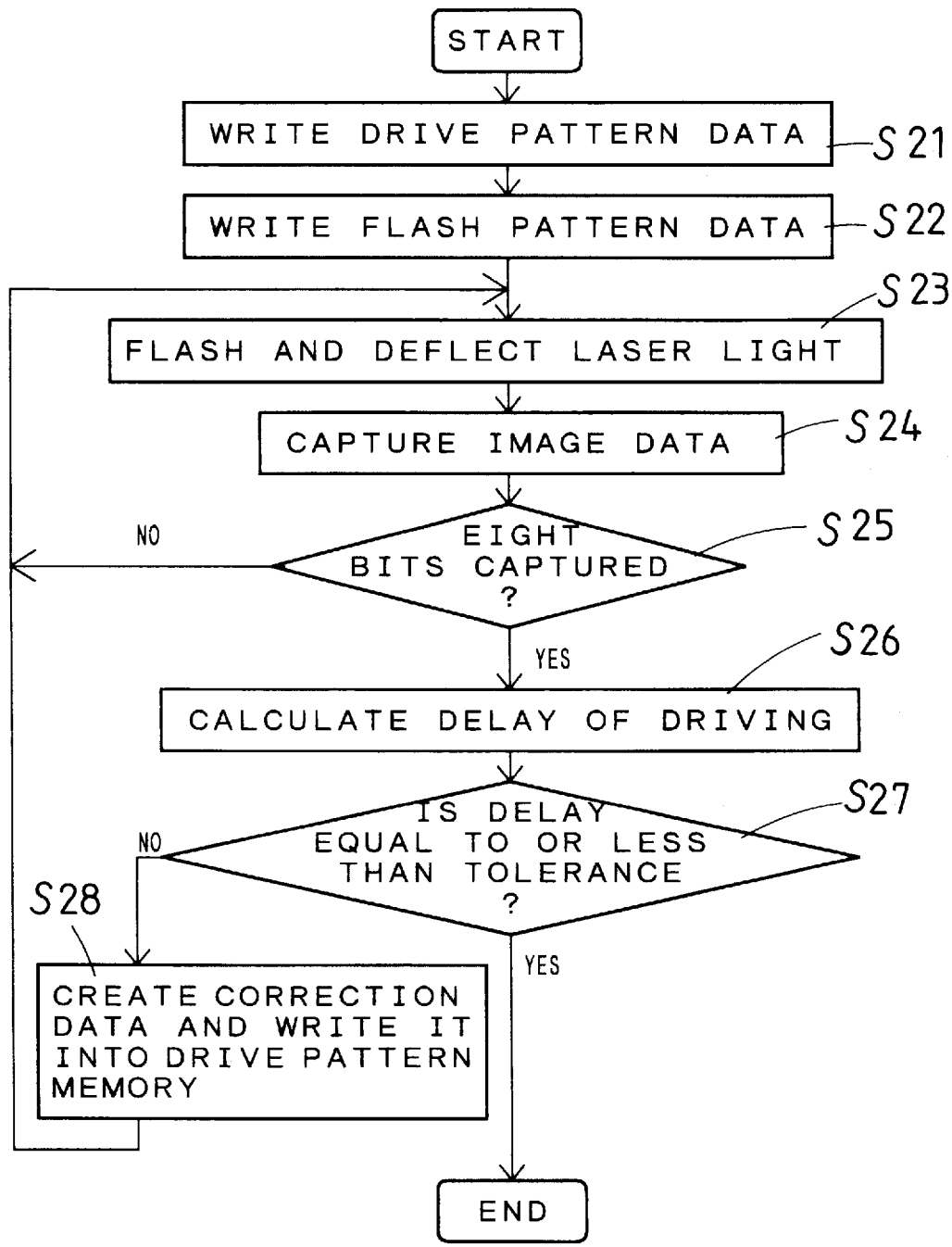
FIG. 13 is a flowchart showing the calibration of a drive pattern of the scanning device.

FIG. 13 shows a flowchart of the calibration for the drive pattern. In S21, drive pattern data for driving the galvanomirror 4 is written into the drive pattern memory 31. The drive pattern to be written at this time may be selected from various patterns such as a triangular waveform pattern and a sine waveform pattern, in which correction is not yet considered.

In S22, bright/dark pattern data for the flashing of the laser light is written into the flash pattern memory 28. The pattern to be written at this time is also a pattern in which correction is not yet considered.

In S23, the laser light is flashed and deflected according to the drive pattern for the galvanomirror 4 and the bright/dark pattern for the flashing respectively written in S21 and S22. The deflection or scanning of the flashing laser light is performed in synchronism with capturing of image data by the CCD camera 6. At this time, a stripe pattern is formed on the reference plane, and it is captured as luminance data by the CCD camera 6 (S24). The data captured is binarized by the capture circuit 14.

In S25, it is determined whether or not eight bits of image data have been captured. If the eight bits of image data have not yet been captured (S25: No), the program returns to S23, in which the data capturing is continued. If the eight bits of image data have been captured (S25: Yes), the program proceeds to S26, in which a delay of the driving of the galvanomirror 4 is calculated. The calculation of the delay is made by comparing the image data captured in S23 and S25 and the drive pattern data written in S21.

In S27, it is determined whether or not the delay calculated in S26 is equal to or less than a predetermined tolerance. If the delay is greater than the tolerance to cause an error unnegligible in the shape measurement (S27: No), the program proceeds to S28, in which correction data for correcting the delay is created and this data is written into the drive pattern memory 31. Then, the program returns to S23 to resume the measurement of S23 and the subsequent steps in accordance with the corrected drive pattern data.

If the delay is equal to or less than the tolerance (S27: Yes), the calibration for the drive pattern is ended.

Figure 8:
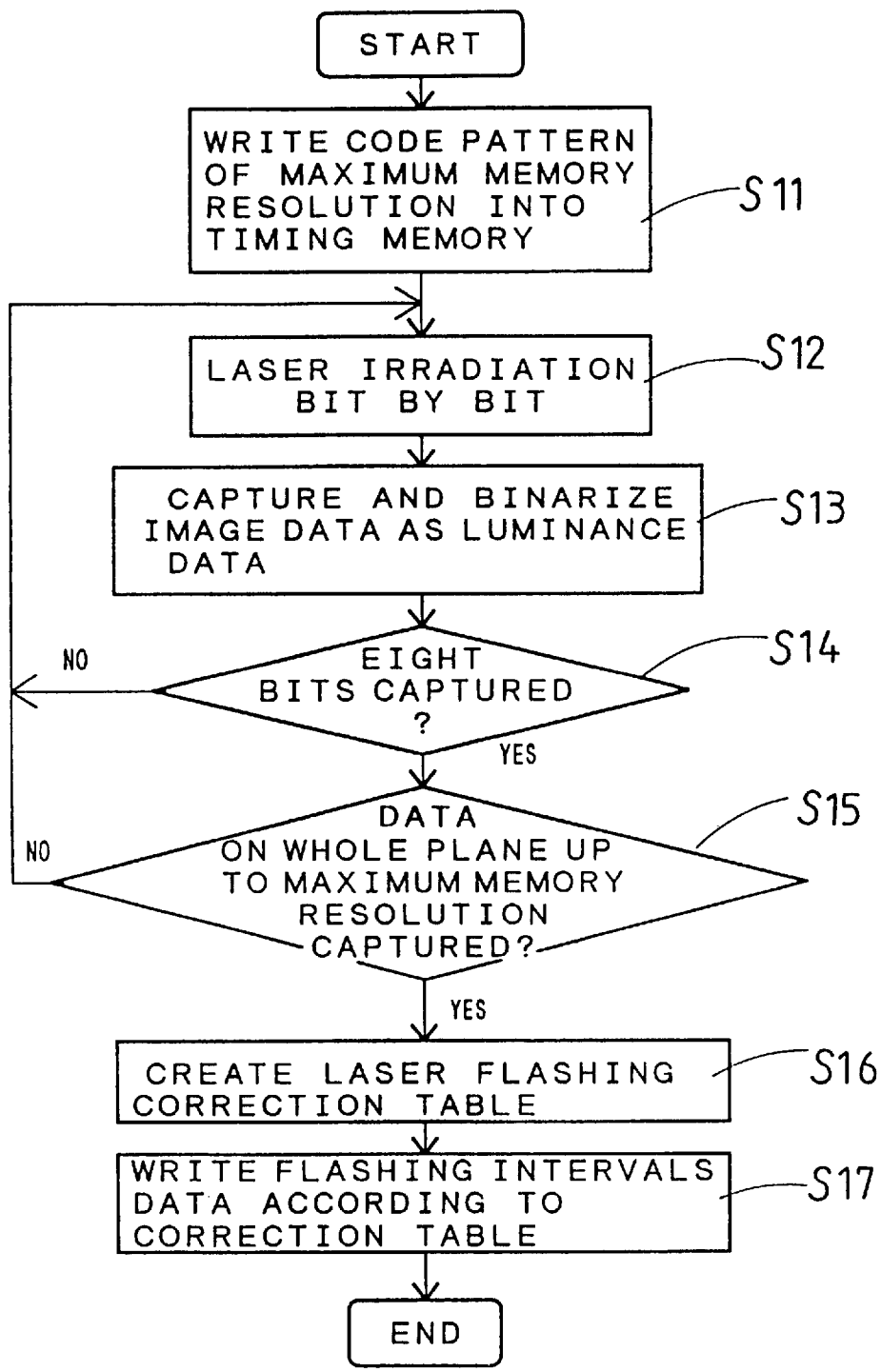
FIG. 8 is a flowchart showing the calibration of a flash pattern of laser light.

After the above calibration is ended, the calibration for the flashing intervals is then performed in accordance with the flowchart shown in FIG. 8 as similarly to the first preferred embodiment.

Thus, the optimization of the drive pattern for the galvanomirror 4 and the flash pattern of the laser light is completed. Thereafter, the object Q is placed on the reference plane to perform actual measurement of the shape of the object Q. Accordingly, the shape measurement can be performed with high precision according to the correction data obtained by the above calibration.

As described above in detail, in the shape measuring device according to the second preferred embodiment, the drive pattern memory 31 is provided to perform the calibration for correcting the actual driving characteristic of the galvanomirror 4 and perform the measurement of the object Q according to the correction data, thereby eliminating an error in driving the galvanomirror 4. Further, the flash pattern memory 28 is provided to perform the calibration of laser flashing intervals and thereby measure the shape of the object Q at such flashing intervals that the bright and dark stripes by flashing are formed at equal intervals on a measurement reference plane. Accordingly, an optimum space code can be obtained, and the resolution can be made constant in the visual field. In addition, the burden to arithmetic elements in calculating three-dimensional coordinates to decide the shape can be reduced. As a result, the shape measurement of the object Q can be quickly performed with high precision. Further, the luminance in the visual field subjected to the measurement can be uniformed by selecting the drive waveform for the galvanomirror 4.

It is to be noted that the present invention is not limited to this preferred embodiment, but various changes and modifications may be made without departing from the scope of the present invention.

What is claimed is:

1. A shape measuring device having a laser light source for generating flash laser light, a scanning device for deflecting said laser light toward an object placed on a measurement plane to scan said object, and image pickup means for picking up image data formed on said object by scanning said laser light, said shape measuring device comprising:

driving means for driving said scanning device so that the scanning of said laser light by said scanning device over a measurement range is performed at least once in a pickup time per frame of said image pickup means;

a pattern memory preliminarily storing plural kinds of flash patterns of said laser light;

flash control means for controlling flashing of said laser light from said laser light source based on a phase of scanning by said scanning device and one of said flash patterns stored in said pattern memory;

generating means for generating space code data from the image data obtained by said image pickup means: and shape computing means for computing a shape of said object from the space code data.

2. A shape measuring device according to claim 1, wherein:

said scanning device comprises a polygon mirror;

said driving means rotationally drives said polygon mirror so that the scanning of said laser light by said polygon mirror over a measurement plane is performed plural times in a pickup time per frame of said image pickup means;

said shape measuring device further comprises phase reference signal generating means for detecting a phase of rotation of said polygon mirror and generating a phase reference signal when said phase becomes a specific phase;

said flash control means controls the flashing of said laser light from said laser light source with reference to said phase reference signal according to one of said flash patterns stored in said pattern memory; and said shape measuring device further comprises pattern changing means for changing said flash pattern followed by said flash control means when said pickup time per frame of said image pickup means has elapsed.

3. A shape measuring device according to claim 2, further comprising light quantity adjusting means for setting the number of times of scanning for actually directing said laser light onto said object in said plural times of scanning performed in said pickup time per frame of said image pickup means.

4. A shape measuring device according to claim 1, wherein:

said laser light is a slit-shaped beam;

said image formed on said object by the scanning of said laser light is a stripe pattern; and said shape measuring device further comprises drive timing means for adjusting generation of a drive signal from said driving means so as to correct a nonlinear relation between said drive signal and an actual deflection angle of said scanning device.

5. A shape measuring device according to claim 4, wherein said drive timing means calculates a correction quantity for said drive signal from said image data obtained by said image pickup means when measurement is made on said measurement plane perpendicular to an optical axis of said image pickup means in a condition where said object is absent on said measurement plane.

6. A shape measuring device according to claim 5, further comprising:

flash timing means for controlling the flashing of said laser light from said laser light source so that said stripe pattern formed on said object by said laser light is divided at equal intervals on said measurement plane perpendicular to said optical axis of said image pickup means;

wherein said shape computing means computes position coordinates in a spatial coordinate system from said image data and deflection angle data to decide the shape of said object.

7. A shape measuring device according to claim 6, wherein said flash timing means decides the flash pattern providing the equal intervals of said stripe pattern on said measurement plane from said image data obtained by said image pickup means when measurement is made on said measurement plane in a condition where said object is absent on said measurement plane.

8. A shape measuring device according to claim 7, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

9. A shape measuring device according to claim 8, wherein said flash pattern changing means changes the flash pattern of said laser light from said laser light source according to a gray code.

10. A shape measuring device according to claim 6, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

11. A shape measuring device according to claim 10, wherein said flash pattern changing means changes the flash pattern of said laser light from said laser light source according to a gray code.

12. A shape measuring device according to claim 4, further comprising:

flash timing means for controlling the flashing of said laser light from said laser light source so that said stripe pattern formed on said object by said laser light is divided at equal intervals on said measurement plane perpendicular to said optical axis of said image pickup means;

wherein said shape computing means computes position coordinates in a spatial coordinate system from said image data and deflection angle data to decide the shape of said object.

13. A shape measuring device according to claim 12, wherein said flash timing means decides the flash pattern providing the equal intervals of said stripe pattern on said measurement plane from said image data obtained by said image pickup means when measurement is made on said measurement plane in a condition where said object is absent on said measurement plane.

14. A shape measuring device according to claim 13, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

15. A shape measuring device according to claim 14, wherein said flash pattern changing means changes the flash pattern of said laser light from said laser light source according to a gray code.

16. A shape measuring device according to claim 12, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

17. A shape measuring device according to claim 16, wherein said flash pattern changing means changes the flash pattern of said laser light from said laser light source according to a gray code.

18. A shape measuring device according to claim 4, wherein said scanning device comprises a galvanomirror.

19. A shape measuring device according to claim 1, further comprising:

binarizing means for binarizing said image data obtained by said image pickup means;

storing means for storing said image data binarized by said binarizing means as space code data;

updating means for performing logic operation between data newly supplied from said binarizing means and data already stored in said storing means to thereby update storage contents of said storing means; and coordinate data generating means for generating coordinate data according to positions on a pickup plane of said image pickup means;

wherein said shape computing means computes the shape of said object according to said space code data and said coordinate data.

20. A shape measuring device according to claim 1, further comprising:

binarizing means for binarizing said image data obtained by said image pickup means;

storing means for storing said image data binarized by said binarizing means as space code data;

coordinate data generating means for generating coordinate data according to positions on a pickup plane of said image pickup means; and converting means preliminarily storing height values corresponding to all space code data and all coordinate data;

wherein said shape computing means reads said height values from said converting means according to said space code data and said coordinate data to thereby compute the shape of said object.

21. A shape measuring device according to claim 20, further comprising:

updating means for performing logic operation between data newly supplied from said binarizing means and data already stored in said storing means to thereby update storage contents of said storing means.

22. A shape measuring device having a laser light source for generating flashing laser light, a lens system for shaping said laser light into a slit-shaped beam, a scanning device for deflecting said laser light shaped into said slit-shaped beam toward an object placed on a measurement plane to scan said object, and image pickup means for picking up a stripe pattern formed on said object by scanning said laser light, said shape measuring device comprising:

driving means for generating a drive signal to drive said scanning device so that the scanning of said laser light by said scanning device over a measurement range is performed at least once in a pickup time per frame of said image pickup means;

drive timing means for adjusting generation of the drive signal by said driving means so as to correct a nonlinear relation between said drive signal and deflection angle data indicative of an actual deflection angle of said scanning device;

generating means for generating space code data from image data obtained by said image pickup means: and shape computing means for computing a shape of said object from the space code data and the deflection angle data.

23. A shape measuring device according to claim 22, wherein said drive timing means calculates a correction quantity for said drive signal from said image data obtained by said image pickup means when measurement is made on said measurement plane perpendicular to an optical axis of said image pickup means in a condition where said object is absent on said measurement plane.

24. A shape measuring device according to claim 23, further comprising:

flash timing means for controlling the flashing of said laser light from said laser light source so that said stripe pattern formed on said object by said laser light is divided at equal intervals on said measurement plane perpendicular to said optical axis of said image pickup means;

wherein said shape computing means computes position coordinates in a spatial coordinate system from said image data and the deflection angle data to decide the shape of said object.

25. A shape measuring device according to claim 24, wherein said flash timing means decides a flash pattern providing the equal intervals of said stripe pattern on said measurement plane from said image data obtained by said image pickup means when measurement is made on said measurement plane in a condition where said object is absent on said measurement plane.

26. A shape measuring device according to claim 25, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

27. A shape measuring device according to claim 26, wherein said flash pattern changing means changes the flash pattern of said laser light from said laser light source according to a gray code.

28. A shape measuring device according to claim 24, further comprising:

flash pattern changing means for changing a flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

29. A shape measuring device according to claim 28, wherein said flash pattern changing means changes the flash pattern of said laser light from said laser light source according to a gray code.

30. A shape measuring device according to claim 22, further comprising:

flash timing means for controlling the flashing of said laser light from said laser light source so that said stripe pattern formed on said object by said laser light is divided at equal intervals on said measurement plane perpendicular to an optical axis of said image pickup means;

wherein said shape computing means computes position coordinates in a spatial coordinate system from said image data and the deflection angle data to decide the shape of said object.

31. A shape measuring device according to claim 30, wherein said flash timing means decides a flash pattern providing the equal intervals of said stripe pattern on said measurement plane from said image data obtained by said image pickup means when measurement is made on said measurement plane in a condition where said object is absent on said measurement plane.

32. A shape measuring device according to claim 31, further comprising:

flash pattern changing means for changing the flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

33. A shape measuring device according to claim 32, wherein said flash pattern changing means changes the flash pattern of said laser light from said laser light source according to a gray code.

34. A shape measuring device according to claim 30, further comprising:

flash pattern changing means for changing a flash pattern of said laser light from said laser light source every time the scanning is performed; and image data storing means capable of storing plural frames of image data obtained by said image pickup means;

wherein said shape computing means computes the shape of said object according to said plural frames of image data picked up with different flash patterns.

35. A shape measuring device according to claim 34, wherein said flash pattern changing means changes the flash pattern of said laser light from said laser light source according to a gray code.

36. A shape measuring device according to claim 22, wherein said scanning device comprises a galvanomirror.

37. A shape measuring device having a laser light source for generating flashing laser light, a scanning device for deflecting said laser light toward an object placed on a measurement plane to scan said object, and image pickup means for picking up image data formed on said object by scanning said laser light, said shape measuring device comprising:

binarizing means for binarizing said image data obtained by said image pickup means;

storing means for storing said image data binarized by said binarizing means as space code data;

updating means for performing a logic operation between image data newly supplied from said binarizing means and image data already stored in said storing means to thereby update storage contents of said storing means;

coordinate data generating means for generating coordinate data according to positions on a pickup plane of said image pickup means; and computing means for computing height values for the object from said space code data and said coordinate data.

38. A shape measuring device having a laser light source for generating flashing laser light, a scanning device for deflecting said laser light toward an object placed on a measurement plane to scan said object, and image pickup means for picking up image data formed on said object by scanning said laser light, said shape measuring device comprising:

binarizing means for binarizing said image data obtained by said image pickup means;

storing means for storing said image data binarized by said binarizing means as space code data;

coordinate data generating means for generating coordinate data according to positions on a pickup plane of said image pickup means;

converting means preliminarily storing height values corresponding to all of the space code data and all of the coordinate data; and shape computing means for reading said height values from said converting means according to said space code data and said coordinate data to thereby compute the shape of said object.

39. A shape measuring device according to claim 38, further comprising:

updating means for performing logic operation between data newly supplied from said binarizing means and data already stored in said storing means to thereby update storage contents of said storing means.

* * * * *